US010267708B2

(12) United States Patent
Skube et al.

(10) Patent No.: US 10,267,708 B2
(45) Date of Patent: Apr. 23, 2019

(54) WIND TUNNEL BALANCE AND METHOD OF USE

(71) Applicant: The Boeing Company, Chicago, IL (US)

(72) Inventors: Seth Skube, Seattle, WA (US); Henry Bennett, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 147 days.

(21) Appl. No.: 15/598,766

(22) Filed: May 18, 2017

(65) Prior Publication Data

US 2018/0335364 A1 Nov. 22, 2018

(51) Int. Cl.
| | | |
|---|---|---|
| G01M 9/04 | (2006.01) | |
| G01M 17/00 | (2006.01) | |
| B64F 5/60 | (2017.01) | |
| G01M 9/06 | (2006.01) | |

(52) U.S. Cl.
CPC .............. *G01M 9/062* (2013.01); *B64F 5/60* (2017.01); *G01M 9/04* (2013.01); *G01M 17/00* (2013.01)

(58) Field of Classification Search
None
See application file for complete search history.

(56) References Cited

U.S. PATENT DOCUMENTS

| | | | |
|---|---|---|---|
| 2,844,027 A | 7/1958 | Davie | |
| 2,909,064 A | 10/1959 | Gelbach et al. | |
| 3,019,643 A | 2/1962 | Curry | |
| 3,159,027 A | 12/1964 | Curry | |
| 3,306,101 A * | 2/1967 | Holderer | G01L 5/161 73/147 |
| 3,552,201 A * | 1/1971 | Horanoff | G01L 5/161 73/147 |
| 4,074,567 A | 2/1978 | Horanoff | |
| 4,532,801 A * | 8/1985 | Coder | G01M 9/08 73/147 |
| 4,663,967 A * | 5/1987 | Parkinson | G01M 9/062 73/147 |

(Continued)

OTHER PUBLICATIONS

Ryan James Callahan, Thesis: "Long-Term Quantitative Study of Wind-Tunnel Balance Calibrations,", dated May 2016.

*Primary Examiner* — Peter J Macchiarolo
*Assistant Examiner* — Jermaine L Jenkins

(57) ABSTRACT

A balance has a balance centerline and an axial force measurement section having a longitudinal slot partially dividing the axial force measurement section into a first part and a second part longitudinally overlapping each other and interconnected by corner flexure groups. The axial force measurement section has an axial force measurement beam located approximately midway between the corner flexure groups. The axial force measurement beam has strain gages for determining axial force on the model. Each corner flexure group includes flexures each having a first flexure root and a second flexure root respectively joined to the first part and the second part. The flexures each have a flexure midpoint between the first and second flexure roots, and a flexure thickness that is tapered along the flexure length from each of the first and second flexure roots to a reduced thickness proximate the flexure midpoint.

20 Claims, 17 Drawing Sheets

(56) References Cited

U.S. PATENT DOCUMENTS

| | | | | |
|---|---|---|---|---|
| 4,845,993 A | * | 7/1989 | Horne | G01M 9/062 |
| | | | | 73/147 |
| 4,938,059 A | * | 7/1990 | Faucher | G01L 5/161 |
| | | | | 73/147 |
| 5,201,218 A | * | 4/1993 | Mole | G01M 9/062 |
| | | | | 338/2 |
| 5,663,497 A | | 9/1997 | Mole | |
| 7,395,727 B2 | * | 7/2008 | Moore | G01L 5/226 |
| | | | | 33/559 |
| 2017/0191889 A1 | * | 7/2017 | Meyer | G01L 5/168 |

\* cited by examiner

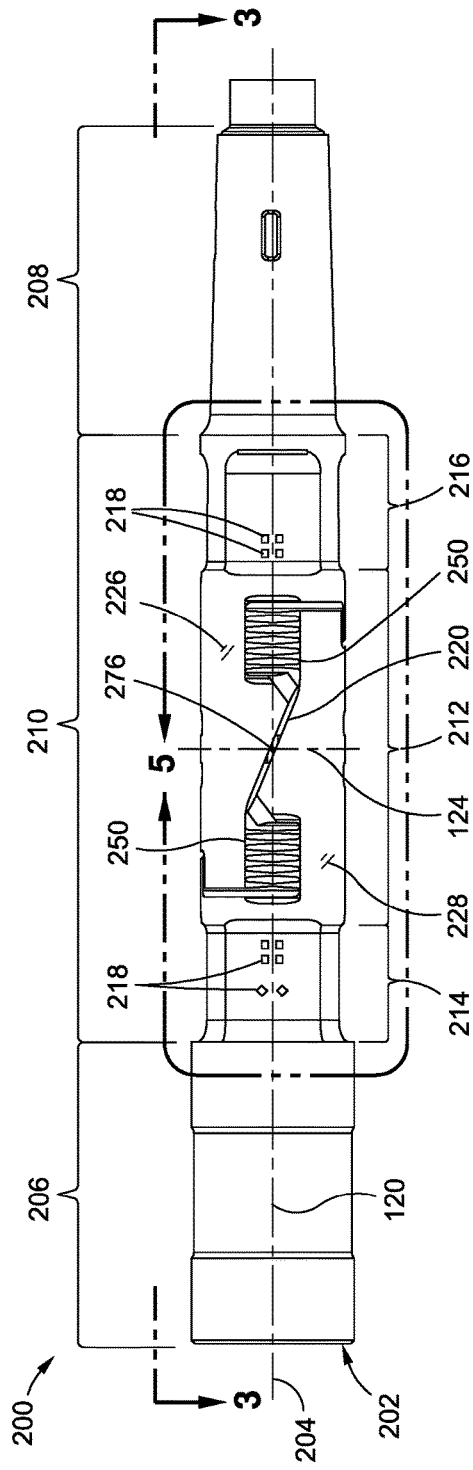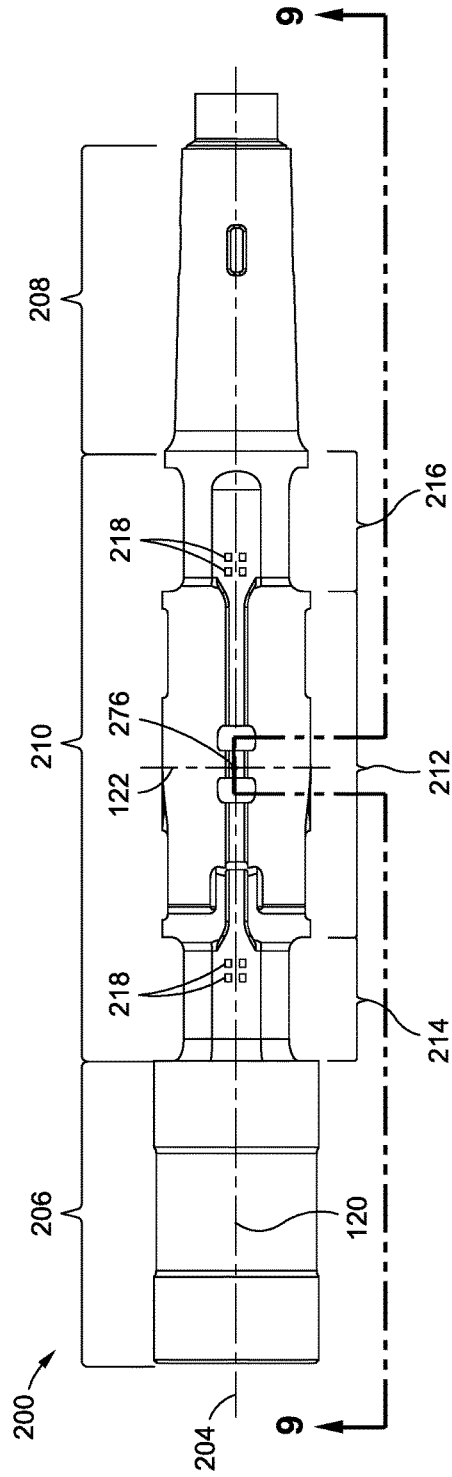

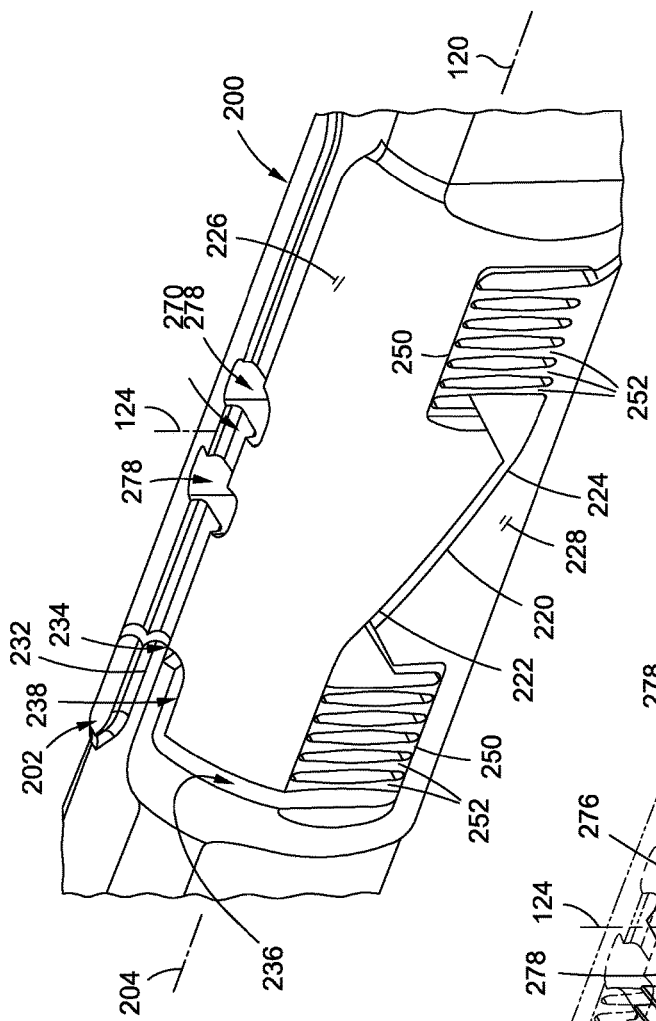
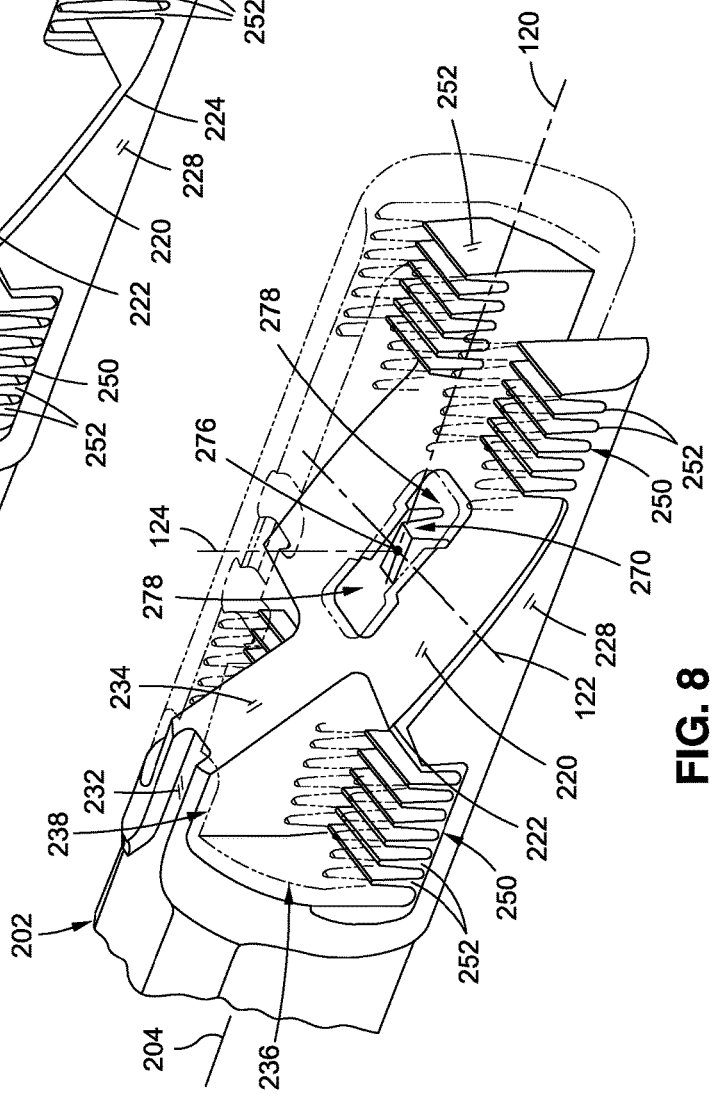

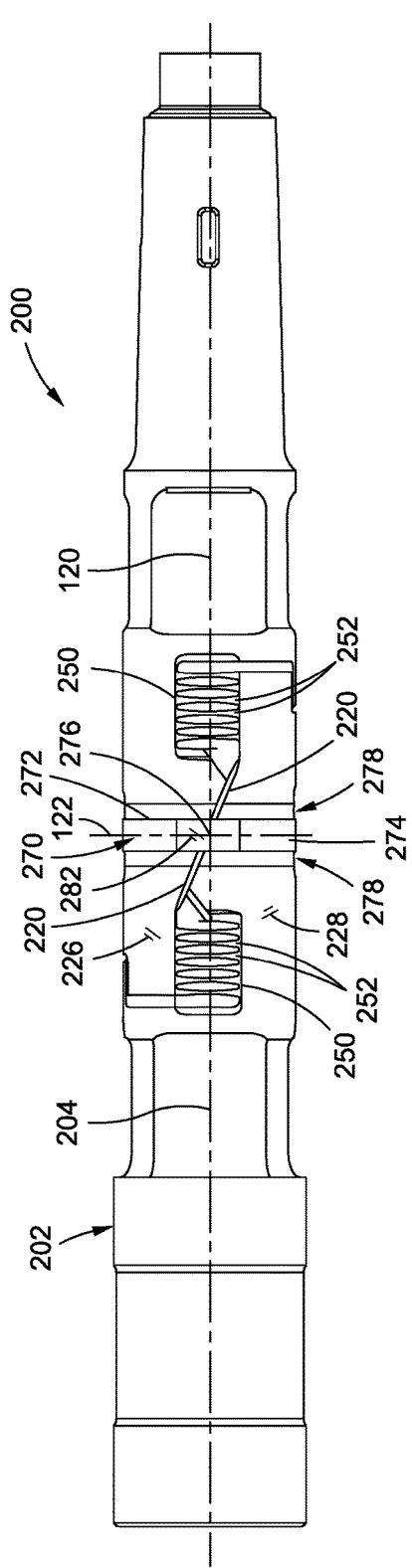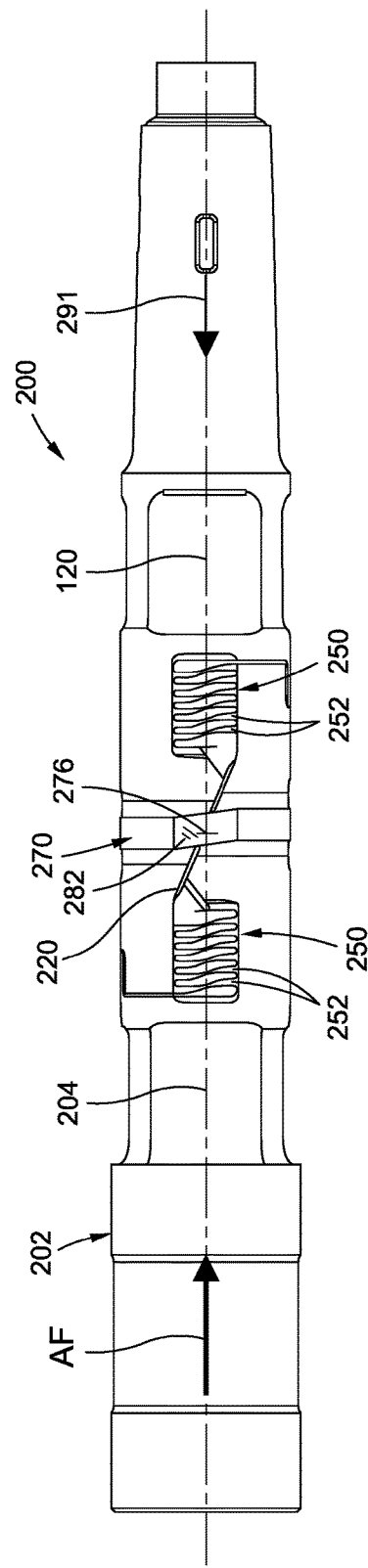
FIG. 9
FIG. 10

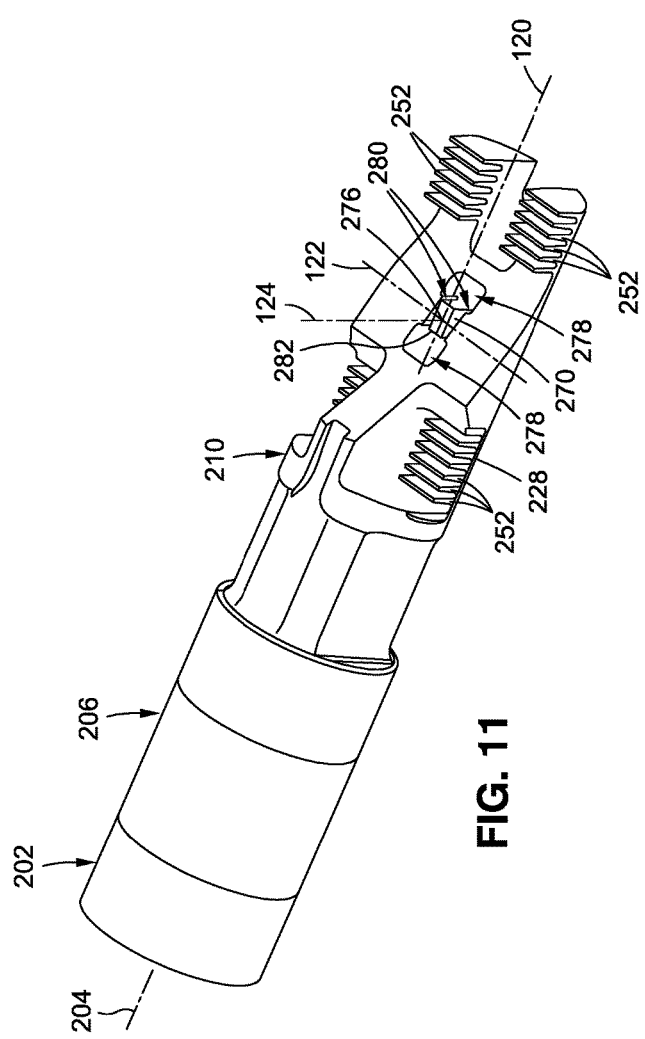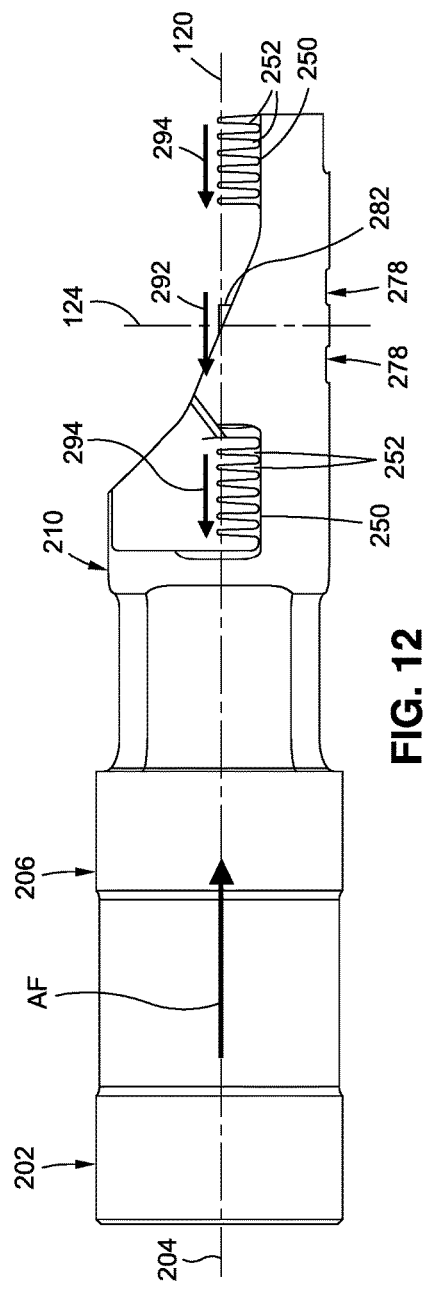

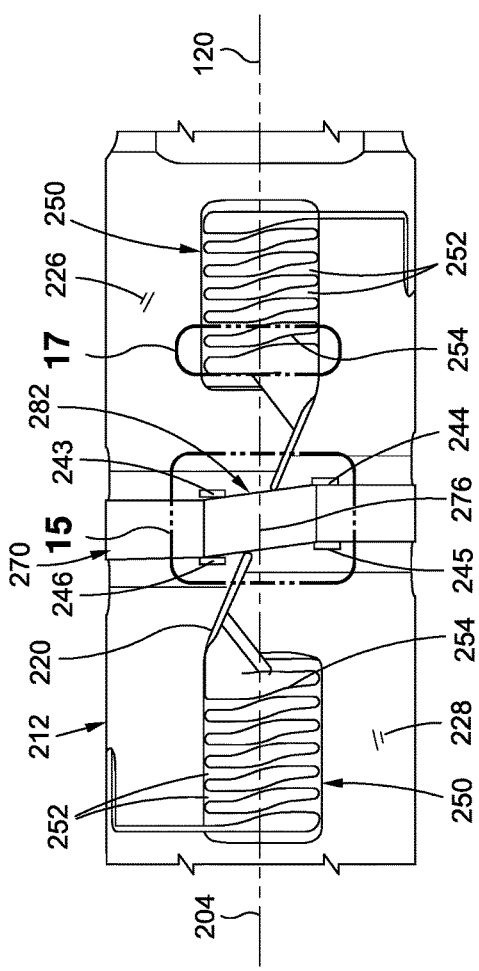
FIG. 13
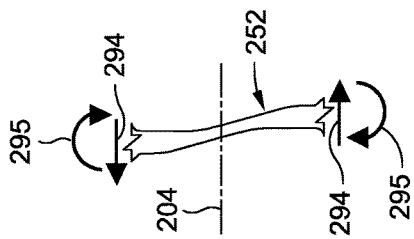
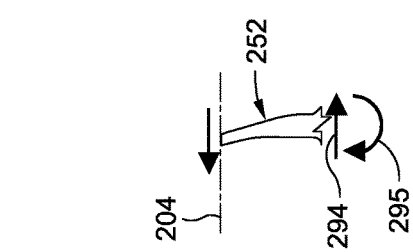
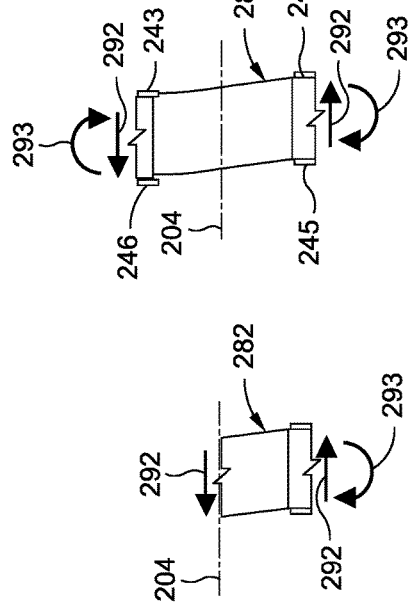

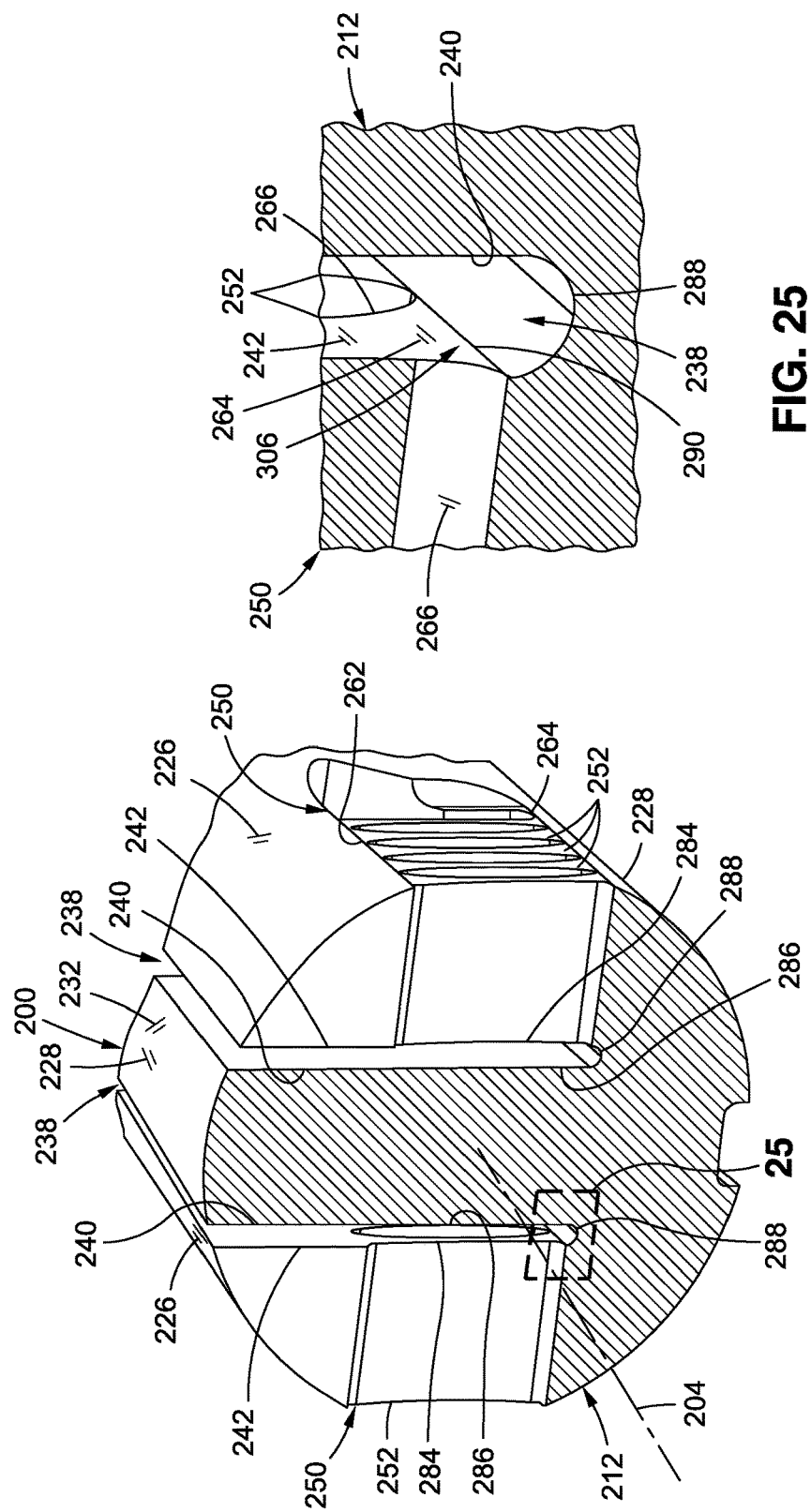

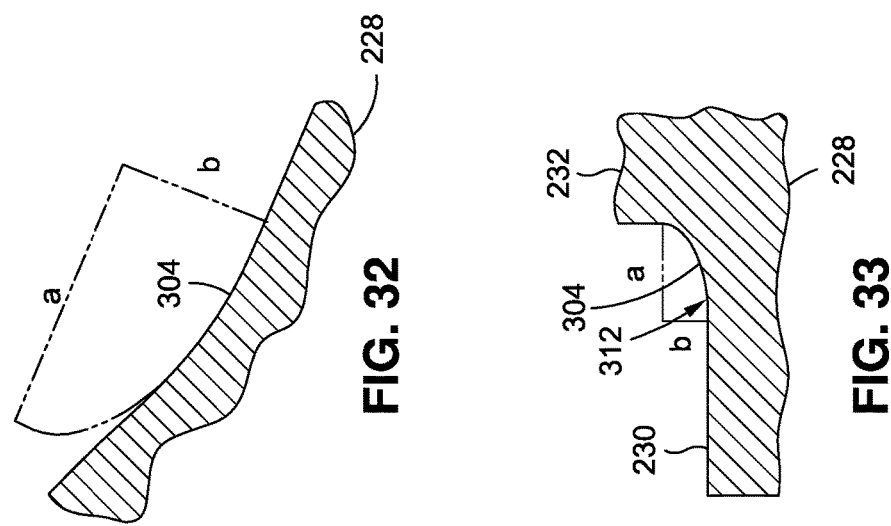
FIG. 32
FIG. 33
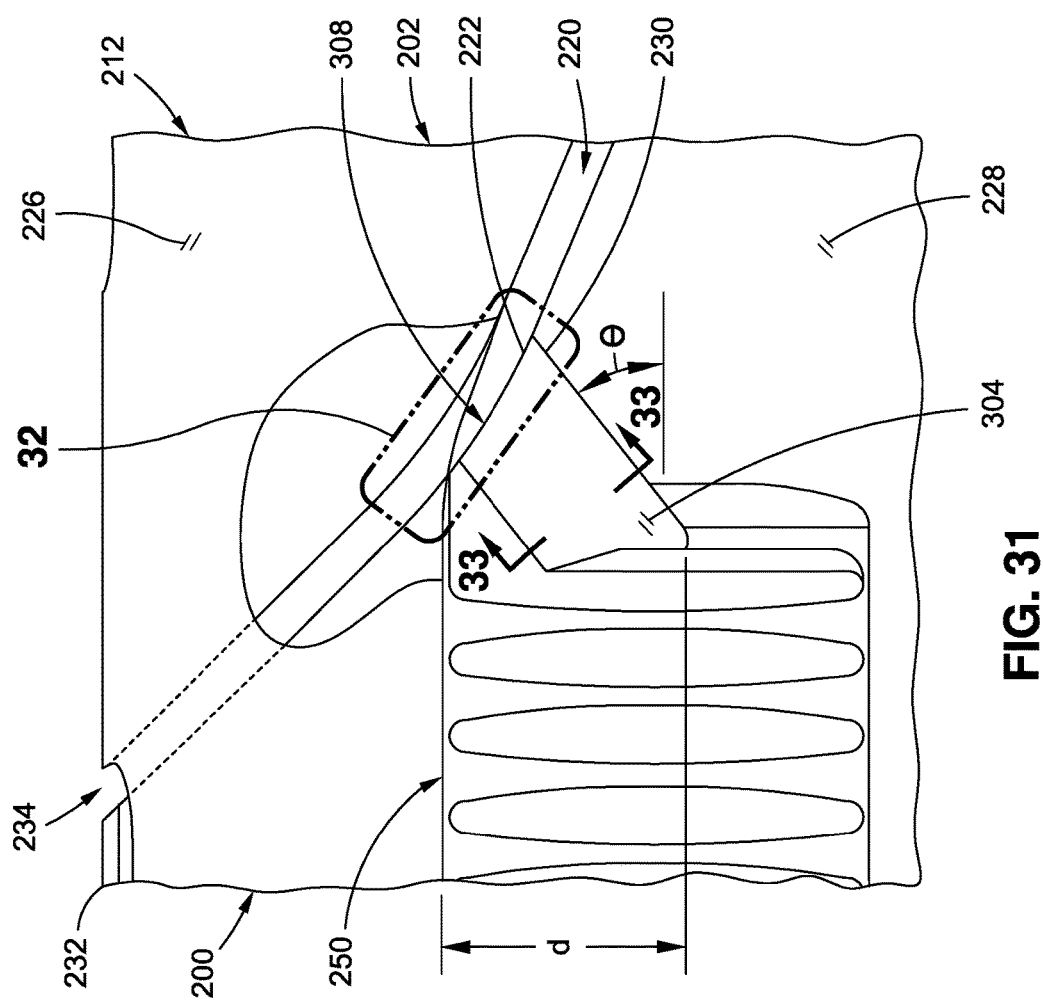
FIG. 31

WIND TUNNEL BALANCE AND METHOD OF USE

FIELD

The present disclosure relates generally to aerodynamic testing in wind tunnels and, more particularly, to a balance for measuring loads on a model in a wind tunnel.

BACKGROUND

Wind tunnels are used to measure the response of a model aircraft to air passing over the model aircraft. The wind tunnel provides a means to evaluate the model aircraft in a controlled environment under conditions that are dynamically similar to conditions to which a full-size version of the model aircraft may be subjected in actual flight. During testing, air in the wind tunnel flows over the model aircraft at controlled speeds in order to evaluate the aerodynamic response of the model aircraft.

The model aircraft may be mounted on an internal balance that may be installed within a cavity in the aircraft fuselage. An aft end of the balance may be coupled to a sting extending out of an aft end of the model aircraft. The sting may be coupled to a wind tunnel support mechanism that provides the ability to statically position and dynamically move the aircraft as air flows over the model aircraft during testing. For example, the sting may change the roll attitude of the model aircraft by rotation about a longitudinal axis of the model aircraft. The sting may also rotate the aircraft about a lateral axis of the model aircraft to change the pitch attitude, or rotate the model aircraft about a vertical axis of the model aircraft to change the yaw attitude of the model aircraft. Changes in roll, pitch, and yaw may be performed in order to measure aerodynamic loads on the model aircraft at different attitudes.

There are six main components of aerodynamic loads that may act on an aircraft, including three forces and three moments. The three forces are normal force, side force, and axial force. Normal force is directed upwardly along the vertical axis, side force acts in a sideways direction along the lateral axis, and axial force acts in an axially aft direction along the longitudinal axis. The three moments include rolling moment, pitching moment, and yawing moment which act as a torque on an aircraft about the respective longitudinal, lateral, and vertical axes of the aircraft.

Measurement of the aerodynamic loads on the model aircraft may be performed using strain gages mounted on the internal balance which may be provided as a multi-piece balance or as a single-piece balance. The strain gages of the internal balance are electrically interconnected in combinations that form bridge circuits for determining the six components of aerodynamic loads on the model aircraft. In general, each bridge circuit generates a bridge electrical response (e.g., measured in micro-volts) in response to an applied load (e.g., measured in engineering units of pounds or inch-pounds). Accurate determination of the magnitude of the loads on a model aircraft is necessary in order to develop and improve the design configuration of a full-size version of the model aircraft. For example, the ability to accurately measure aerodynamic drag on a model aircraft of a commercial airliner in a wind tunnel can result in design improvements that translate into a significant reduction in fuel consumption over the service life of a full-size airliner.

However, of the six components of aerodynamic loads, axial force is typically significantly smaller than the other forces acting on the model aircraft. As a result, axial force sensitivity must be higher than the sensitivity of other loads on the balance, wherein sensitivity may be described as the slope of the bridge electrical response (e.g., in micro-volts) vs. engineering units (e.g., in pounds or inch-pounds). The need for increased axial force sensitivity is complicated by a trend toward increasingly higher static loads and higher dynamic loads on model aircraft in wind tunnels, and which requires balances that have higher static load-carrying capability and higher resistance to fatigue stress for improved fatigue life of the balance. Due to limits on the cross-sectional size of the cavity within the model aircraft, static load-carrying capability and fatigue resistance cannot be improved by increasing the size (e.g., diameter) of the balance.

A multi-piece balance may have a higher load-carrying capability than a single-piece balance of the same diameter, and may therefore be capable of handling the higher stresses associated with increasingly higher static and dynamic loads on a scale model in a wind tunnel. However, the high stresses on a multi-piece balance may result in failure of the balance due to fatigue stress over time. In addition, the quality of data provided by a multi-piece balance generally degrades over time, requiring frequent calibration of the multi-piece balance which is time-consuming, complex, and costly. The relatively lower load-carrying capability of a single-piece balance may require that during wind tunnel testing, loads on the model aircraft are limited to avoid exceeding the structural capability of the balance. Limiting the loads to which the balance is subjected may prevent testing of the model aircraft to its maximum design loads.

As can be seen, there exists a need in the art for a wind tunnel balance having high sensitivity to axial force measurements and which is capable of handling high static and dynamic loads while consistently providing high quality data.

SUMMARY

The above-noted needs associated with wind tunnel balances are specifically addressed and alleviated by the present disclosure which provides an internal balance having a balance centerline and an instrumentation portion extending axially between a model interface portion for supporting a wind tunnel model, and a sting interface portion for coupling to a sting of a wind tunnel. The instrumentation portion includes an axial force measurement section and at least one moment/force measurement section. The moment/force measurement section has strain gages for determining moments and/or lateral forces on the model. The axial force measurement section includes a longitudinal slot having opposing slot ends and partially dividing the axial force measurement section into a first part and a second part longitudinally overlapping each other and interconnected by a corner flexure group at each of the slot ends on each of opposing lateral sides of the balance centerline. The axial force measurement section has an axial force measurement beam located at a balance longitudinal center located approximately midway between the corner flexure groups. The axial force measurement beam has a measurement beam first end and a measurement beam second end respectively coupled to the first part and the second part. The axial force measurement beam includes strain gages for determining axial force on the model. Each corner flexure group includes a plurality of spaced parallel flexures each having a flexure length extending between a first flexure root and a second flexure root respectively joined to the first part and the second part. The flexures each have a flexure midpoint located between the first and second flexure roots. In addition, the flexures have a flexure thickness that is tapered along the flexure length from each of the first and second flexure roots to a reduced thickness proximate the flexure midpoint.

In a further embodiment, disclosed is an internal balance having a balance centerline and an instrumentation portion having an axial force measurement section and at least one moment/force measurement section. The axial force measurement section includes a longitudinal slot having opposing slot ends. The longitudinal slot partially divides the axial force measurement section into a first part and a second part longitudinally overlapping each other and interconnected by a corner flexure group at each of the slot ends on each of opposing lateral sides of the balance centerline. As mentioned above, each corner flexure group includes a plurality of spaced parallel flexures each having a flexure length extending between a first flexure root and a second flexure root respectively joined to the first part and the second part. The axial force measurement section has an axial force measurement beam located approximately midway between the corner flexure groups and further includes a measurement beam first end and a measurement beam second end respectively coupled to the first part and the second part. The balance body includes a vertical slot at each corner flexure group. The vertical slot has an inboard slot wall and an outboard slot wall respectively defining a laterally inboard side of the flexures and a side wall of an interior portion of the first part or the second part. Each interior portion is located between a pair of the corner flexure groups respectively on opposing lateral sides of the balance centerline. The inboard slot wall and the outboard slot wall at each corner flexure group terminate at a slot base fillet. The inboard slot wall transitions to the slot base fillet at a fillet tangent point. At least one flexure in at least one corner flexure group includes a flexure fillet at an intersection of the first flexure root or the second flexure root respectively with the first part or the second part. The fillet tangent point may be aligned with a lowermost portion of the flexure fillet.

Also disclosed is a method of measuring loads on a model in a wind tunnel. The method includes supporting the model on a model interface portion of a balance having a sting interface portion coupled to a sting of a wind tunnel. The balance has an instrumentation portion extending axially between the model interface portion and the sting interface portion. The instrumentation portion includes an axial force measurement section and at least one moment/force measurement section having strain gages for determining moments and/or lateral forces on the model. The axial force measurement section has a longitudinal slot partially separating a first part and a second part longitudinally overlapping each other and interconnected by a corner flexure group at each of opposing slot ends on each of opposing lateral sides of a balance centerline. The method additionally includes passing a fluid such as air over the model. Furthermore, the method includes determining, using strain gages mounted on the axial force measurement beam located approximately midway between the corner flexure groups, axial force applied to the model during the passing of the fluid over the model. Each corner flexure group may include a plurality of spaced parallel flexures each having a flexure length extending between a first flexure root and a second flexure root respectively joined to the first part and the second part. The flexures each have a flexure midpoint between the first flexure root and second flexure root. In addition, the flexures have a flexure thickness that is tapered along the flexure length from each of the first flexure root and second flexure root to a reduced thickness proximate the flexure midpoint.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a side view of an example of the presently-disclosed balance having an instrumentation portion extending axially between a model interface portion for supporting the model, and a sting interface portion for coupling to a sting of the wind tunnel;

FIG. 3 is a top view of the balance taken along line 3-3 of FIG. 2;

FIG. 7 is a perspective view of the balance illustrating the axial force measurement section and showing a longitudinal slot dividing the axial force measurement section into a first part and a second part overlapping each other and interconnected by four corner flexure groups each containing a plurality of spaced parallel flexures;

FIG. 8 is a perspective view of the axial force measurement section of FIG. 7 with the first part omitted to illustrate the axial force measurement beam located at a balance longitudinal center;

FIG. 9 is a side view of the balance taken along line 9-9 of FIG. 3 and illustrating the axial force measurement beam located approximately midway between the corner flexure groups;

FIG. 10 is a side view of the balance of FIG. 9 during the application of pure axial force and illustrating the flexing of the measurement beam flexure portion and the flexing of the flexures in reaction to the axial force;

FIG. 11 is a perspective view of the balance showing the model interface portion and the instrumentation portion with the first part omitted and the flexures severed along a horizontal plane (not shown) containing the balance centerline;

FIG. 12 is a side view of the balance of FIG. 11 and illustrating the application of pure axial force onto the balance and which is reacted by the measurement beam flexure portion and the flexures;

FIG. 13 is a magnified side view of the axial force measurement section illustrating the flexing of the measurement beam flexure portion and the flexing of the individual flexures in reaction to the axial force shown in FIG. 12;

FIG. 14 is a side view of the portion of the measurement beam flexure portion located below the balance centerline and illustrating a beam reaction force, a beam bending moment, and the flexing of the measurement beam flexure portion in reaction to the axial force shown in FIG. 12;

FIG. 15 is a side view of the entire length of the measurement beam flexure portion of FIG. 13 and illustrating the beam reaction force, the beam bending moment, and further illustrating strain gages for measuring compression and tension at opposite ends of the measurement beam flexure portion;

FIG. 16 is a side view of the portion of one of the flexures located below the balance centerline and illustrating a flexure reaction force, a flexure bending moment, and the flexing of the flexure in reaction to the axial force shown in FIG. 12;

FIG. 17 is a side view of the entire length of the flexure of FIG. 13 and illustrating the flexure reaction force and the bending moment at each of opposing flexure roots of the flexure;

FIG. 24 is a perspective view of the balance sectioned along line 24-24 of FIG. 5 and illustrating an offset vertical slot having opposing slot walls respectively defining a laterally inboard side of the flexures and a side wall of an interior portion of the second part;

FIG. 25 is a magnified perspective view of the offset vertical slot terminating at a slot base fillet having a fillet tangent point that is aligned with a lowermost portion of the flexure fillet;

FIG. 31 is a magnified side view of a portion of the balance taken along line 31 of FIG. 30 and illustrating a transition from shovel slot to the longitudinal slot, and further illustrating a relief cut at the intersection of the longitudinal slot with the corner flexure group;

FIG. 32 is a partial sectional view of a portion of the balance taken along line 32 of FIG. 31 and illustrating a non-constant-radius fillet at the transition from the shovel slot to the longitudinal slot at the slot forward end;

FIG. 33 is a partial sectional view of a portion of the balance taken along line 33-33 of FIG. 31 and illustrating a non-constant-radius fillet at the intersection of the relief cut with an interior portion of the second part;

DETAILED DESCRIPTION

Figure 1:
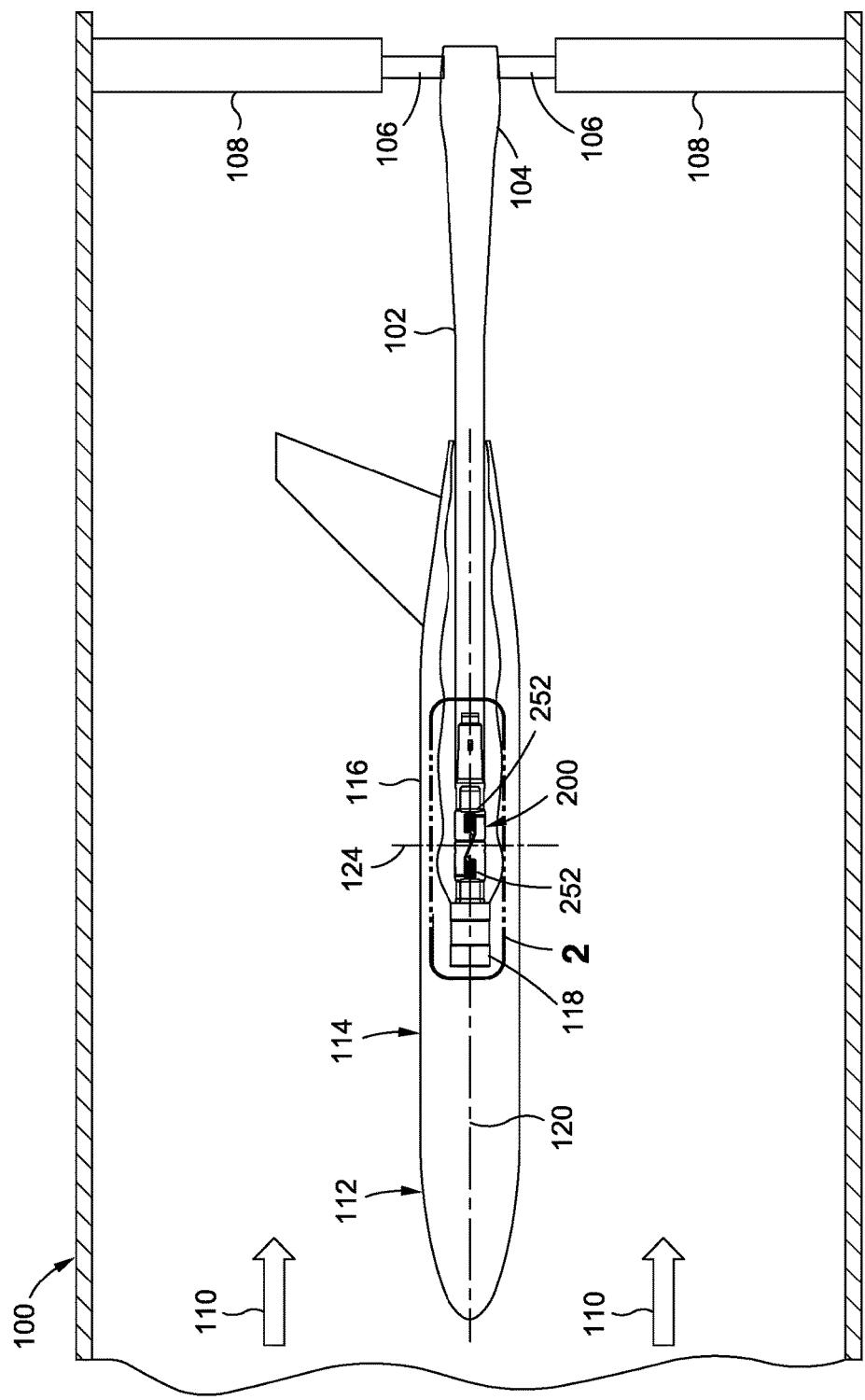
FIG. 1 is a side view of a wind tunnel containing a model of an aircraft supported on a balance.

Referring now to the drawings wherein the showings are for purposes of illustrating various embodiments of the disclosure, shown in FIG. 1 is a side view of a wind tunnel 100 containing a model 112 of an aircraft 114 supported on the presently-disclosed internal balance 200. The wind tunnel 100 is adapted for directing a flow of fluid 110 (e.g., air) over the model 112 in a manner that simulates the actual environment to which a real-world (e.g., full-size) version of the model 112 may be subjected. For example, the wind tunnel 100 may be used for determining the drag characteristics of the model 112 aircraft 114 oriented at different attitudes to predict the drag characteristics of a full-scale version of the model 112 aircraft 114 under actual flight conditions. Advantageously, the presently-disclosed balance 200 includes flexures 252 (e.g., FIGS. 18-19) that are tapered in a manner that increases the flexibility of the flexures 252 relative to non-tapered flexures. As described in greater detail below, the increased flexibility of the flexures 252 increases the sensitivity of the balance 200 to axial force measurement for determining aerodynamic axial force AF (FIG. 4) on the model 112. In addition, the increased axial force sensitivity reduces the interaction of other forces on axial force measurement. For example, the increased axial force sensitivity reduces the interaction of normal force NF (FIG. 4) on the measurement of axial force AF. Furthermore, the tapered flexures 252 allow the balance 200 to structurally withstand higher loads than an equivalent balance (not shown) having non-tapered flexures.

In FIG. 1, the balance 200 is installed within a cavity 118 of a fuselage 116 of the model 112 aircraft 114. An aft end of the balance 200 is coupled to a sting 102 extending out of an aft end of the model 112. In the example shown, the sting 102 may terminate at a hub 104 that may be supported on a shaft 106 extending from radial vanes 108 that are respectively coupled to the sides of the wind tunnel 100. The sting 102 may provide the ability to statically position and/or dynamically move the model 112 during testing. Although the presently-disclosed balance 200 is described and illustrated in the context of a model 112 aircraft 114, the balance 200 may be implemented for wind tunnel testing of any one a variety of different types of air vehicles including, but not limited to, any type of fixed-wing aircraft, rotary-wing aircraft, missile, and other types of air vehicles. Furthermore, the balance 200 may be implemented for wind tunnel testing of any type of non-flight vehicle or any type of non-vehicular object, and is not limited to testing of model 112 aircraft 114.

FIG. 2 is a side view of an example of the presently-disclosed balance 200 as may be used for supporting a wind tunnel model 112 (FIG. 1). The balance 200 includes a balance body 202 comprising an elongate beam. The balance 200 has a balance centerline 204 extending longitudinally from a forward end of the balance 200 to an aft and the balance 200. The balance 200 may be positioned within the model 112 such that the balance centerline 204 is parallel to or coincident with a longitudinal axis 120 (FIG. 1) of the model 112. In addition, the balance 200 may be positioned within the model 112 such that a balance longitudinal center 276 is coincident with the center of gravity (not shown) of the model 112.

Referring to FIGS. 2-3, the balance 200 includes an instrumentation portion 210 extending axially between a model interface portion 206 and a sting interface portion 208. The model interface portion 206 is located at the forward end the balance 200 and is configured to be installed within the cavity 118 (FIG. 1) and rigidly coupled to the model 112 (FIG. 1). The sting interface portion 208 is located at the aft end of the balance 200 and is configured to be rigidly coupled to the sting 102 (FIG. 1). The balance body 202 may be formed as an elongate one-piece element. For example, the balance body 202 may be machined from a single piece of material such as metal (e.g., steel) bar stock. Advantageously, a one-piece balance avoids hysteresis that may occur in a multi-piece balance as a result of slight relative movement between mating components which may develop over time in a one multi-piece balance (not shown) and which may have a negative effect on the accuracy of load measurements, requiring more frequent calibration of the multi-piece balance. In the presently-disclosed balance 200, the model interface portion 206 may have a cross-sectional width (e.g. a diameter) in the range of approximately 0.5-5.0 inch or more. In the example shown, the model interface portion 206 has a generally round cross-sectional shape such as circular cross-sectional shape. The sting interface portion 208 may have a generally conical shape that tapers along a direction toward the aft end of the balance 200. However, the model interface portion 206 and the sting interface portion 208 may be provided in any one a variety of different sizes, shapes, and configurations.

Referring to FIGS. 2-5, the instrumentation portion 210 may include an axial force measurement section 212 and at least one moment/force measurement section. A moment/force measurement section includes strain gages 218 for determining moments and/or lateral forces acting on the model 112 (FIG. 1) during wind tunnel testing. In an embodiment not shown, the instrumentation portion 210 may include a single moment/force measurement section located forward of the axial force measurement section 212. Alternatively, the instrumentation portion 210 may include a single moment/force measurement section located aft of the axial force measurement section 212. In the example shown, the instrumentation portion 210 includes an axial force measurement section 212 extending axially between a forward moment/force measurement section 214 and an aft moment/force measurement section 216. Each one of the moment/force measurement sections 214, 216 includes strain gages 218 for determining moments and/or lateral forces acting on the model 112 (FIG. 1) during wind tunnel testing. The moments and/or lateral forces may include different components of aerodynamic loads that may act on the model 112 (FIG. 1). In the presently-disclosed balance 200, strain gages may be provided as resistance foil strain gages, as semiconductor strain gages, or in other strain gage configurations.

Figure 4:
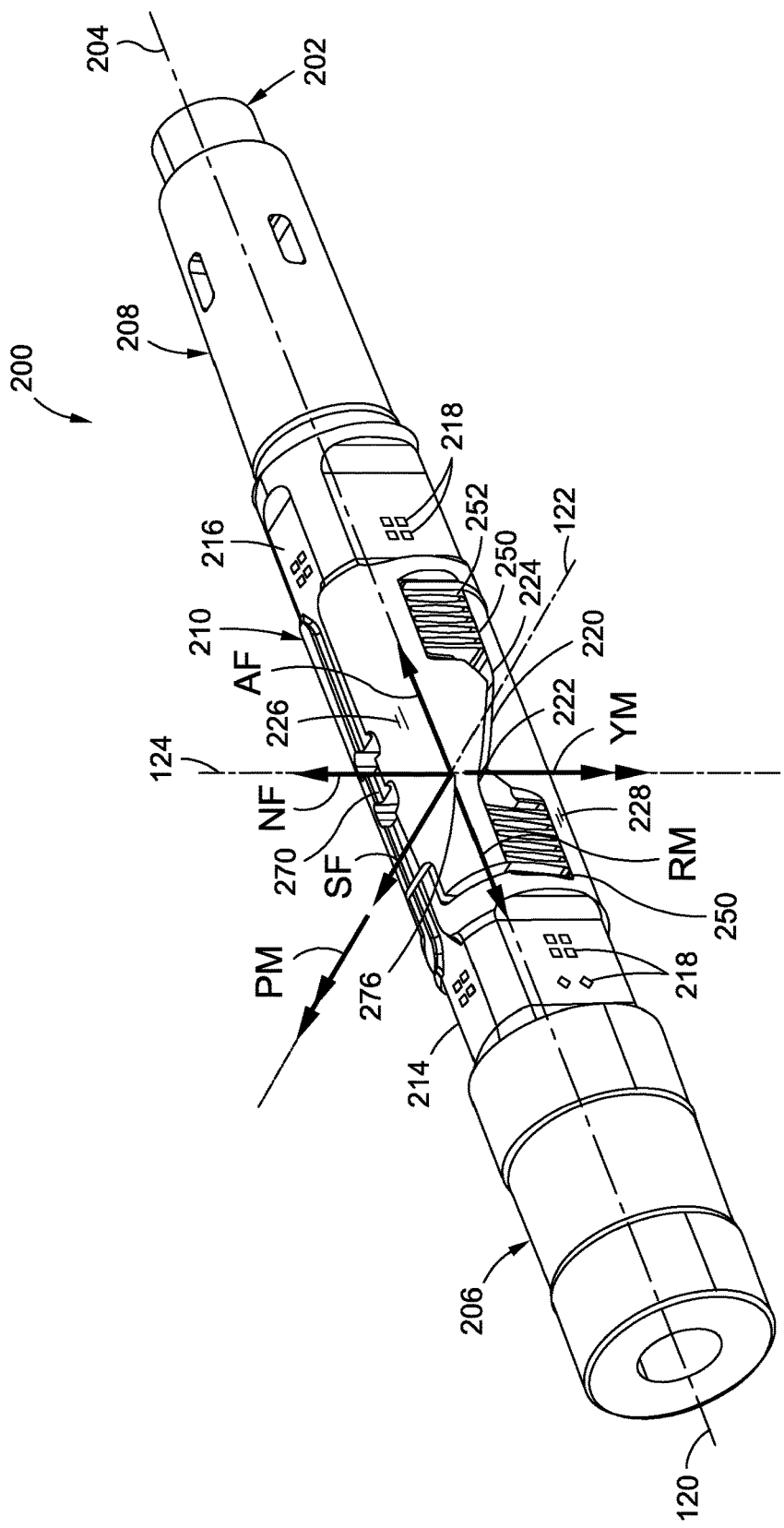
FIG. 4 is a perspective view of the balance of FIGS. 2-3 showing six different components of aerodynamic load that may act on the model and which are measured by the balance.

Referring to FIG. 4, shown is the balance and the superimposition of the six components of aerodynamic loads that may act on the model 112 (FIG. 1). The six components include normal force NF, side force SF, axial force AF, pitching moment PM, rolling moment RM, and yawing moment YM. The moment/force measurement sections 214, 216 may include strain gages 218 for measuring the moments on the model 112 including pitching moment PM, rolling moment RM, and yawing moment YM. In addition, the strain gages 218 of the moment/force measurement sections 214, 216 may measure two (2) of the lateral forces on the model 112 including normal force NF and side force SF In the present disclosure, lateral forces are forces that are oriented parallel to the vertical axis 124 or parallel to the lateral axis 122. The vertical axis 124 and the lateral axis 122 are both perpendicular to the balance centerline 204. As described below, the axial force measurement section 212 include an axial force measurement beam 270 having strain gages 243, 244, 245, 246 (FIGS. 6 and 15) for measuring axial force AF on the model 112. In the present disclosure, axial force AF is oriented parallel to the balance centerline 204 which is coincident with (e.g., aligned with or parallel to) the longitudinal axis 120. The strain gages of the balance 200 may be electrically interconnected in combinations that form bridge circuits (not shown—e.g., Wheatstone bridge circuits) for determining the six different components of aerodynamic loads that may act on the model 112.

As shown in FIG. 4, each moment/force measurement section 214, 216 may have a generally orthogonal transverse cross-sectional shape. For example, each moment-lateral force measurement section 214, 216 may have a generally rectangular transverse cross-sectional shape having a greater thickness along the vertical axis 124 than along the lateral axis 122. In the present disclosure, the normal force NF is parallel to the direction of the vertical axis 124. The side force SF is parallel to the direction of the lateral axis 122. As mentioned above, the axial force AF is parallel to the longitudinal axis 120 which is parallel to or coincident with the balance centerline 204.

Figure 5:
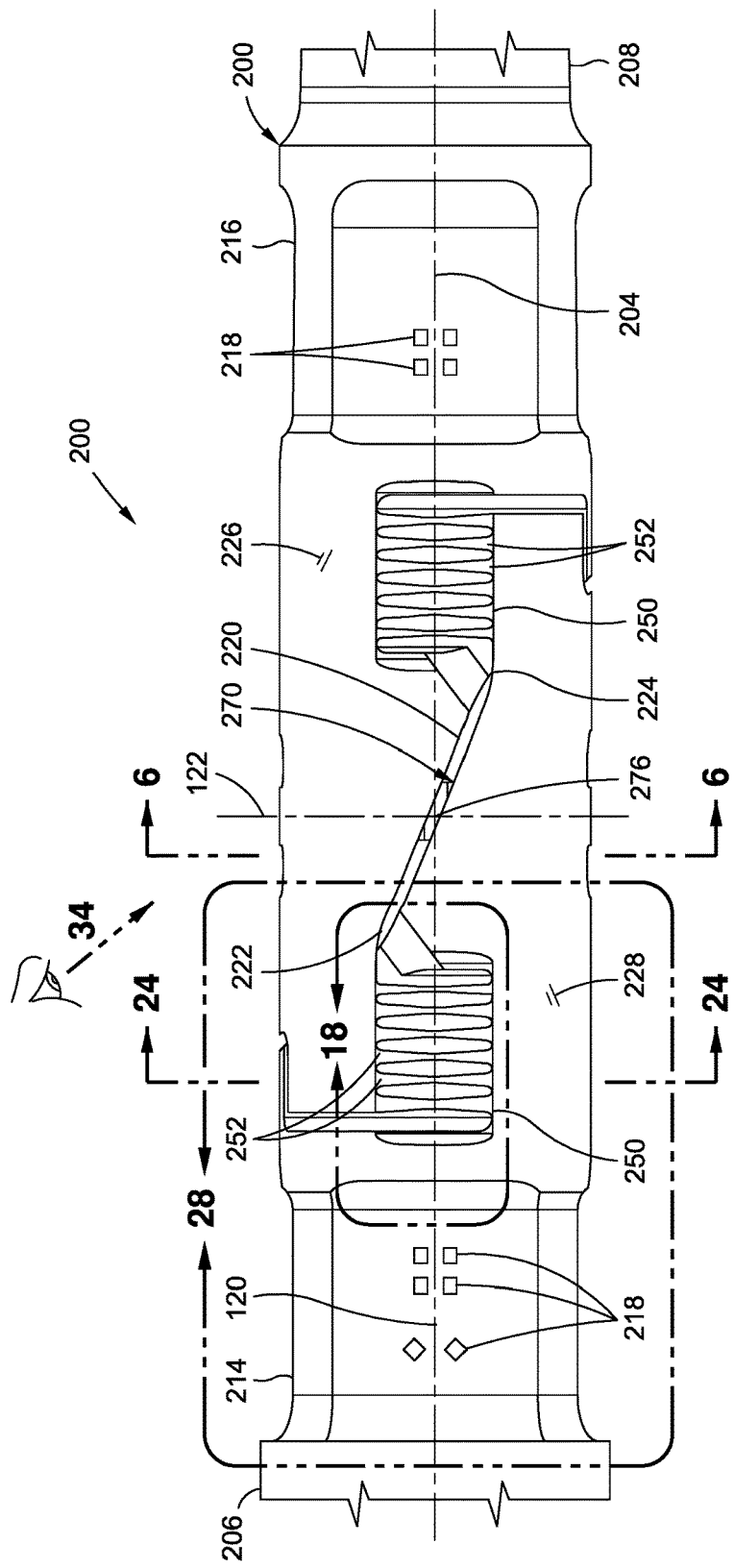
FIG. 5 is a magnified side view of the instrumentation portion of the balance taken along line 5 of FIG. 2 and illustrating an axial force measurement section extending axially between a forward moment/force measurement section and an aft moment/force measurement section.
Figure 6:
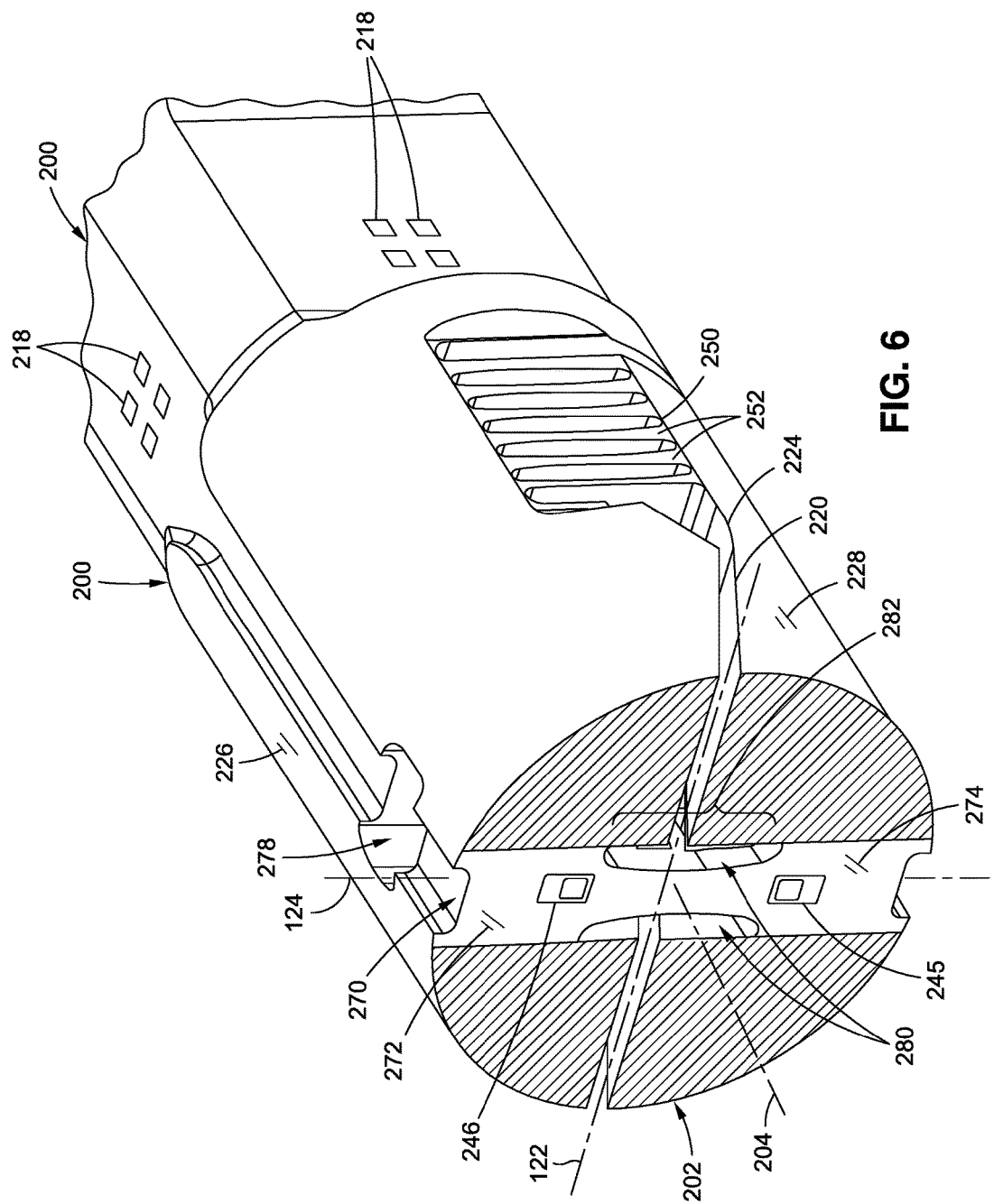
FIG. 6 is a perspective view of the balance sectioned along line 6-6 of FIG. 5 and illustrating an axial force measurement beam located within the balance and further illustrating a measurement beam flexure portion of the axial force measurement beam.

Referring to FIGS. 4-6, the axial force measurement section 212 includes a longitudinal slot 220 having opposing slot ends including a slot forward end 222 and a slot aft end 224. In the example shown, the longitudinal slot 220 is inclined at an angle relative to the balance centerline 204 when the balance 200 is viewed from the side. However, in an embodiment not shown, the longitudinal slot 220 may be oriented parallel to the balance centerline 204. The longitudinal slot 220 partially separates the axial force measurement section 212 into a first part 226 and a second part 228. The first part 226 and the second part 228 longitudinally overlap each other and are interconnected by a corner flexure group 250 at each of the opposing slot ends 222, 224 on each of opposing lateral sides of the balance centerline 204. In this regard, the balance 200 includes a total of four (4) corner flexure groups 250.

Each one of the corner flexure groups 250 includes a plurality of spaced parallel flexures 252. As described in greater detail below, the flexures 252 are oriented and configured to transfer moments and lateral forces between the first part 226 and the second part 228 so that the forward and aft moment/force measurement sections 214, 216 can measure moments and/or lateral forces acting on the model 112 (FIG. 1) during wind tunnel testing. In addition, the flexures 252 are configured to flex (see FIG. 13) along a direction parallel to the longitudinal axis 120 when the balance 200 is subjected to axial force AF (FIGS. 10 and 12), allowing the first part 226 to move longitudinally relative to the second part 228 (FIG. 13) so that strain gages 243, 244, 245, 246 (FIG. 6) mounted on an axial force measurement beam 270 (FIG. 6) coupling the first part 226 to the second part 228 can measure axial force AF, as described in greater detail below.

FIGS. 5-8 show the axial force measurement beam 270 which is located at the balance longitudinal center 276 (FIG. 5). The balance longitudinal center 276 may be located at a position on the balance centerline 204 approximately midway between the corner flexure groups 250 when the balance 200 is viewed from the side. The axial force measurement beam 270 has a measurement beam first end 272 and a measurement beam second end 274 respectively coupled to the first part 226 and the second part 228. As described in greater detail below, the axial force measurement beam 270 includes strain gages 243, 244, 245, 246 (FIGS. 6 and 15) for determining the axial force AF on the model 112 (FIG. 1) as a result of the air flowing over the model 112 during wind tunnel testing.

Referring to FIG. 6-9, the axial force measurement beam 270 includes a measurement beam flexure portion 282. The measurement beam flexure portion 282 is physically isolated from the first part 226 and the second part 228 by a spaced pair of measurement beam vertical cutouts 278 (FIGS. 7-8) located on longitudinally opposite sides of the measurement beam flexure portion 282. The measurement beam vertical cutouts 278 each extend completely through the balance body 202. In addition, the measurement beam flexure portion 282 is physically isolated from the first part 226 and the second part 228 by a pair of measurement beam vertical slots 280 (FIG. 6) located on laterally opposite sides of the balance centerline 204. As shown in FIG. 6, the measurement beam flexure portion 282 may have a lateral thickness that tapers from opposing vertical ends of the measurement beam flexure portion 282 toward a reduced thickness at an approximate midpoint of the measurement beam flexure portion 282. However, in an embodiment not shown, the measurement beam flexure portion 282 may have a constant lateral thickness. As mentioned above, the axial force measurement beam 270 includes strain gages 243, 244, 245, 246 (FIGS. 6 and 15) at each end of the measurement beam flexure portion 282 and on each of longitudinally opposing sides of the axial force measurement beam 270.

Referring to FIGS. 7-8, the axial force measurement section 212 of the balance body 202 includes a shovel slot 234 at each of the opposing slot ends 222, 224 of the longitudinal slot 220. In addition, at each shovel slot 234, the axial force measurement section 212 includes an offset vertical slot 238 and a transverse vertical slot 236 on each of opposing lateral sides of the balance centerline 204. The shovel slots 234 in combination with the offset vertical slots 238 and the transverse vertical slots 236 separate the first part 226 from the second part 228. At each one of the opposing slot ends 222, 224, the combination of the shovel slot 234, the offset vertical slot 238, and the transverse vertical slot 236 defines an interior portion 232.

Referring to FIG. 9, shown is side view of the balance 200 partially cutaway to illustrate the axial force measurement beam 270. As indicated earlier, the axial force measurement beam 270 is vertically oriented and is located approximately midway between the corner flexure groups 250. The measurement beam flexure portion 282 is shown located between the measurement beam first end 272 and the measurement beam second end 274 which are respectively coupled to the first part 226 and the second part 228 of the balance body 202.

Referring to FIG. 10, shown is the balance 200 of FIG. 9 during the application of pure axial force AF transmitted to the balance 200 by the model 112 (FIG. 1). The axial force AF is reacted by a reaction force 291 distributed between the flexures 252 and the measurement beam flexure portion 282 according to the respective stiffnesses of the flexures 252 and the measurement beam flexure portion 282. FIG. 10 illustrates the flexing of the measurement beam flexure portion 282 and the flexing of the flexures 252 in response to the axial force AF.

Referring to FIG. 11-12, shown is the model interface portion 206 and the instrumentation portion 210 of the balance 200. The first part 226 of the balance 200 is omitted and the flexures 252 are severed at the balance centerline 204 to illustrate (FIG. 11) the measurement beam vertical cutouts 278 and the measurement beam vertical slots 280 that physically separate the measurement beam flexure portion 282 from the first part 226 and the second part 228 of the balance body 202. FIG. 12 illustrates the pure axial force AF transmitted by the model 112 (FIG. 1) to the balance 200, and which is reacted by the reaction force 291 (FIG. 10) comprising a beam reaction force 292 provided by the axial force measurement section 212 and a flexure reaction force 294 provided by the flexures 252.

FIG. 13 is a magnified side view of the axial force measurement section 212 partially cutaway to illustrate the axial force measurement beam 270. During application of the axial force AF (FIG. 12) to the balance 200, the longitudinal slot 220 allows the first part 226 and second part 228 to move relative to one another along a direction parallel to the balance centerline 204. The movement of the first part 226 relative to the second part 228 allows the measurement beam flexure portion 282 and the flexures 252 to flex in reaction to the axial force AF.

FIG. 14 is a magnified view of the portion of the measurement beam flexure portion 282 located below the balance centerline 204 and illustrating a beam reaction force 292 and a beam bending moment 293 and corresponding flexing of the measurement beam flexure portion 282 according to the stiffness of the measurement beam flexure portion 282. FIG. 15 is a side view of the entire length of the measurement beam flexure portion 282 illustrating the beam reaction force 292 and the beam bending moment 293 in the measurement beam flexure portion 282 in reaction to the pure axial force AF (FIGS. 10 and 12). Also shown are strain gages 243, 244, 245, and 246 mounted at opposite ends of the measurement beam flexure portion 282 and on longitudinally opposite sides of the measurement beam flexure portion 282. During the application of axial force AF on the balance 200, strain gages 243 and 245 measure compression in the measurement beam flexure portion 282, and strain gages 244 and 246 measure tension in the measurement beam flexure portion 282. As indicated above, the strain gages 243, 244, 245, 246 are electrically interconnected in a manner forming a bridge circuit (not shown) for determining the magnitude of the axial force AF (i.e., drag) component of the aerodynamic loads on the model 112 (FIG. 1).

FIG. 16 is a magnified view of the portion of one of the flexures 252 below the balance centerline 204 and illustrating a flexure reaction force 294 and a flexure bending moment 295 and corresponding flexing of the flexure 252 according to the stiffness of the flexure 252. FIG. 17 is a side view of the entire length of the flexure 252 illustrating the flexure reaction force 294 and flexure bending moment 295 in reaction to the pure axial force AF (FIGS. 10 and 12). As mentioned above, the flexures 252 of the balance 200 are tapered (FIGS. 18-19) along the flexure length 256 to reduce the stiffness of the flexures 252 relative to the stiffness of non-tapered flexures (not shown). The increased flexibility of the flexures 252 results in a relative increase in the amount of the axial force AF reacted by the measurement beam flexure portion 282 relative to the amount of axial force AF reacted by the flexures 252.

Figure 18:
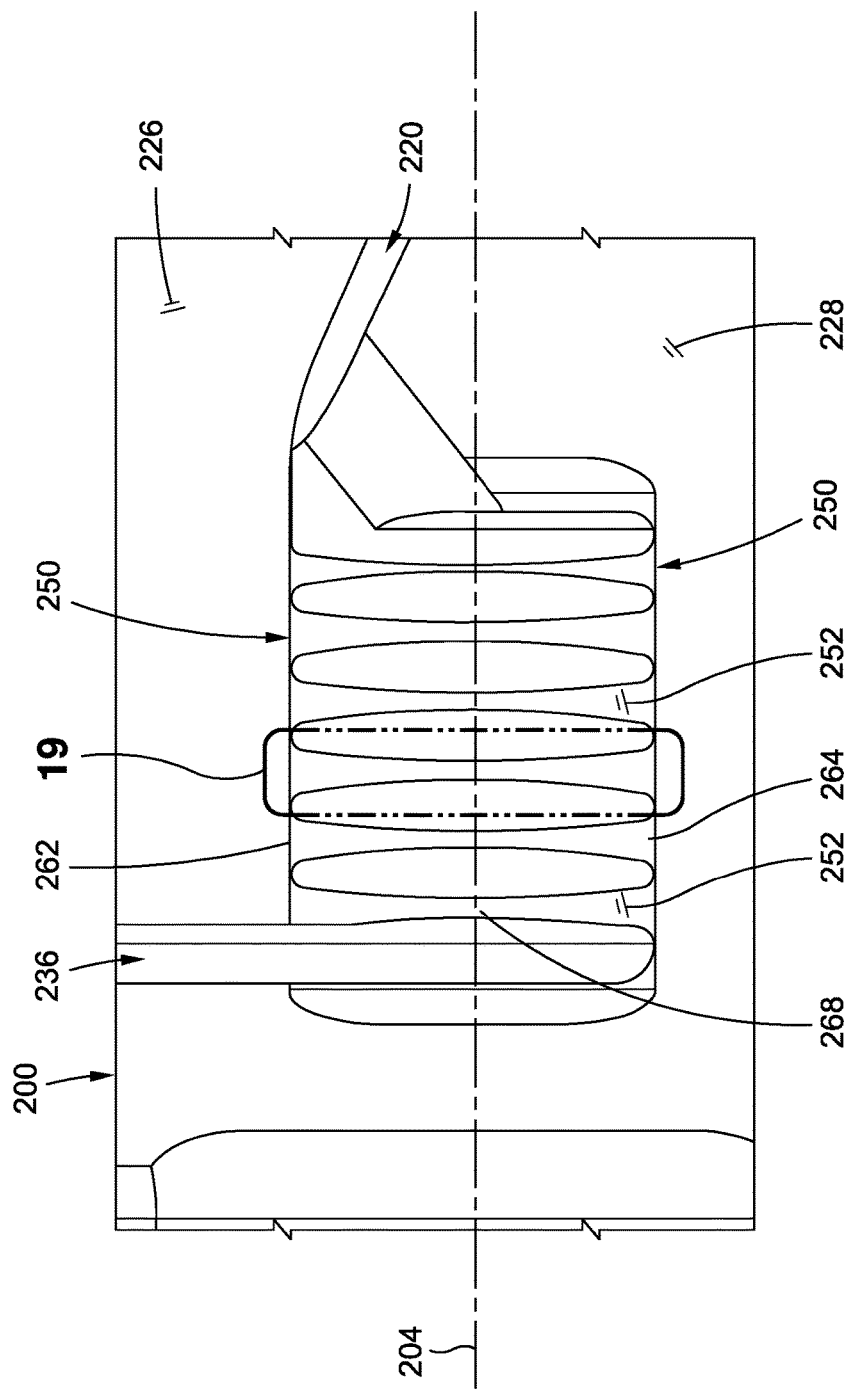
FIG. 18 is a magnified side view of one of the corner flexure groups showing each one of the flexures having a flexure thickness that is tapered along the flexure length from each of opposing flexure roots to a reduced thickness proximate a flexure midpoint.

FIG. 18 is a magnified side view of one of the corner flexure groups 250 of the total of four (4) corner flexure groups 250 that couple the first part 226 to the second part 228. Each corner flexure group 250 includes one or more flexures 252 arranged in parallel spaced relation to each other. Each one of the flexures 252 is oriented perpendicular to the balance centerline 204. Although each corner flexure group 250 of the presently-disclosed balance 200 has six (6) flexures, each corner flexure group 250 may include anywhere from 1-10 or more flexures 252. Each one of the flexures 252 has a first flexure root 262 and a second flexure root 264 respectively joined to the first part 226 and the second part 228.

Figures 19, 20, 21, 22, 23:
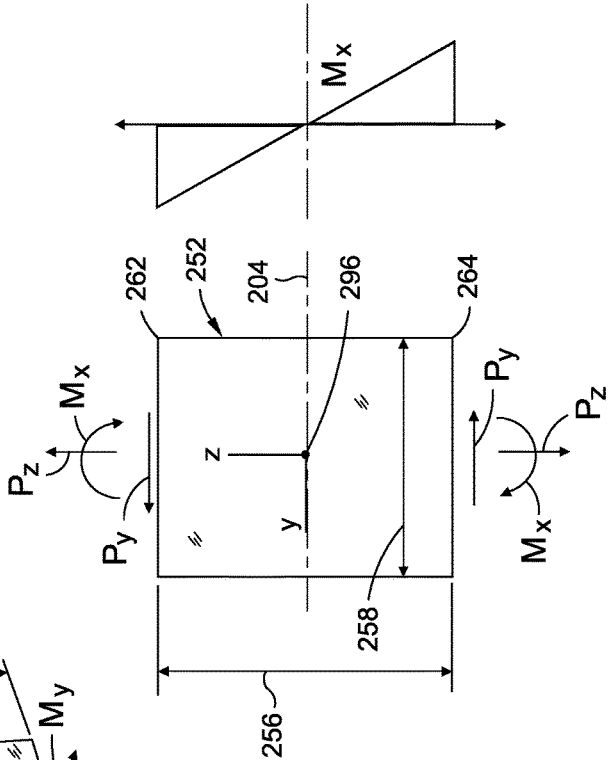
FIG. 19 is a side view of one of the tapered flexures of FIG. 18 and illustrating normal load Pz, transverse shear Px, and bending moment My in response to the simultaneous application of the six components of aerodynamic load on the balance.
FIG. 20 is a diagram of the linearly varying bending moment My generated in the flexure in response to the application of the six load components on the balance.
FIG. 21 is a front view of one of the flexures of FIG. 19 and illustrating normal load Pz, transverse shear Py, and bending moment Mx generated in the flexure in response to the application of the six load components.
FIG. 22 is a diagram of the linearly varying bending moment Mx generated in response to the application of the six load components.
FIG. 23 is a perspective view of the flexure of FIGS. 19 and 21 showing the orientation of forces and bending moments and further illustrating the dimensions of flexure length, flexure width, and flexure thickness.

Referring to FIG. 19, shown is a side view of one of the flexures 252 illustrating a flexure length 256 extending between the first flexure root 262 and the second flexure root 264. The flexures each have a flexure midpoint 268 located midway between the first flexure root 262 and the second flexure root 264. Each flexure 252 has a flexure thickness 260 that is tapered along the flexure length 256 from the first flexure root 262 and the second flexure root 264 to a reduced thickness proximate the flexure midpoint 268. FIG. 19 also illustrates the orientation of normal load Pz, transverse shear Px, and bending moment My in the flexure 252 during the simultaneous application of the six components of aerodynamic load (FIG. 4) on the balance 200. As mentioned above and as illustrated in FIG. 4, the six components include normal force NF, side force SF, axial force AF, pitching moment PM, rolling moment RM, and yawing moment YM.

In FIGS. 19-23, the forces (e.g., normal load and shear load) and bending moments on a flexure 252 are oriented in relation to a flexure reference coordinate system 296 (FIGS. 19, 21, and 23) in which the x-axis is parallel to the longitudinal axis 120 (FIG. 4) and balance centerline 204, the y-axis is parallel to the lateral axis 122 (FIG. 4), and the z-axis is parallel to the vertical axis 124 (FIG. 4). FIG. 20 is a diagram of linearly varying bending moment My generated in response to the simultaneous application of the six components of aerodynamic load. The bending moment My is at a maximum at the first flexure root 262 and at the second flexure root 264 and is zero at the flexure midpoint 268.

FIG. 21 is a front view of one of the flexures 252 illustrating the orientation of normal load Pz, transverse shear Py, and bending moment Mx in response to the simultaneous application of the six components of aerodynamic load (FIG. 4). Also shown is the flexure length 256 and the flexure width 258 of the flexure 252 when the flexure 252 is viewed from the front along a direction parallel to the balance centerline 204. FIG. 22 is a diagram of the linearly varying bending moment Mx generated in response to the simultaneous application of the six components of aerodynamic load. Similar to FIG. 20, the bending moment Mx in FIG. 22 is at a maximum at the first flexure root 262 and the second flexure root 264 and is zero at the flexure midpoint 268. FIG. 23 is a perspective view of the flexure 252 of FIGS. 19 and 21 showing the orientation of forces and bending moments on the flexure 252, and showing the dimensions of flexure length 256, flexure width 258, and flexure thickness 260. The flexure thickness 260 is tapered, while the flexure length 256 and flexure width 258 are constant.

As mentioned above, the tapered flexures 252 (e.g., FIGS. 18, 19, and 23) increase the flexibility of the flexures 252 relative to the flexibility of non-tapered flexures. The increased flexibility of the flexures 252 increases the amount of axial force AF (FIG. 12) that is reacted by the measurement beam flexure portion 282, and reduces the amount of axial force AF that is reacted by the flexures 252. The increase in the amount of axial force AF reacted by the measurement beam flexure portion 282 increases the sensitivity to axial force AF measurements as measured by the strain gages 243, 244, 245, 246 (FIGS. 6 and 15) mounted on the axial force measurement beam 270. The increased flexibility of the flexures 252 also reduces the interaction of other forces on axial force AF measurements, such as the interaction of normal force NF (FIG. 4) on axial force AF measurements. The reduced interaction of other forces on axial force AF measurement increases the accuracy of the axial force AF measurements.

Referring again to FIG. 19, the flexure thickness 260 of the individual flexures 252 in each corner flexure group 250 is tapered along the flexure length 256 from each of the first flexure root 262 and the second flexure root 264 to a reduced thickness proximate the flexure midpoint 268, as mentioned above. In correspondence with the bending moment diagram of FIG. 20, the flexure thickness 260 may be at a maximum at the first flexure root 262 and at the second flexure root 264 where the bending moment My is at a maximum, and the flexure thickness 260 may be at a minimum at the flexure midpoint 268 where the bending moment My is zero. At any widthwise location of a flexure 252, the stress is approximately constant (e.g., within 20 percent) along the flexure length 256 at that widthwise location. Due to differences in load levels at different location in the balance 200, the lengthwise-constant stress level at one widthwise location of a flexure 252 may be different than the lengthwise-constant stress level at a different widthwise location of the same flexure 252.

Referring still to FIG. 19, in an embodiment, the flexure thickness 260 may be tapered along a lengthwise direction in a manner such that stress in the flexure 252 is approximately constant along the flexure length 256 when the six components of aerodynamic loads (FIG. 4) are simultaneously applied to the balance 200. The taper in the flexure thickness 260 may be described as any variation in flexure thickness 260 along the flexure length 256, and may include a linear variation in flexure thickness 260 from flexure root to flexure midpoint 268, or a non-linear variation in flexure thickness 260 from flexure root to flexure midpoint 268. In some examples, the flexure thickness 260 of each flexure 252 in a corner flexure group 250 may be uniquely tapered according to an anticipated load predicted to be borne by the flexure.

In an embodiment for determining the geometry of the taper in flexure thickness 260 of a flexure 252, the loads on the flexure 252 may be extracted from a linear finite element model (not shown) of the balance 200 when subjected to the six components of aerodynamic loads (FIG. 4). Free-body loads (not shown) on the flexure 252 may be summed at the section centroids (not shown) of the flexure 252. The free-body loads may be used to calculate cross-sectional axial stress and bending stresses in the flexure 252. The spring constant of the flexure 252 may be determined using the known M/EI diagram method in which the flexure 252 is □roken into a number of discrete constant-EI sections (not shown), and wherein M is the bending moment My (FIG. 20) at each constant-EI section, and EI represents the flexural stiffness of the discrete section in which E is the modulus of elasticity of the balance material, and I is the moment of inertia of the constant-EI section.

Referring briefly to FIG. 13, in an embodiment, of all the flexures 252 in a corner flexure group 250, the flexure 252 located nearest the balance longitudinal center 276 may be described as a critical flexure 254 in the sense that the critical flexure 254 has the highest stress of all the flexures 252 in the corner flexure group 250 when the balance 200 is subjected to a combination of all six components (FIG. 4) of aerodynamic loads. The critical flexure 254 may have the same degree of taper as the remaining flexures in the corner flexure group 250. However, the critical flexure 254 may be configured with a flexure thickness 260 that is less than the corresponding flexure thickness 260 at the same flexure lengthwise location in each of the remaining flexures in the corner flexure group 250. For example, the critical flexure 254 may have a flexure thickness that is at least 10-50% smaller than the corresponding flexure thickness 260 at the same flexure lengthwise location in each of the remaining flexures of the corner flexure group 250. By configuring the critical flexure 254 to have a smaller flexure thickness 260 than the remaining flexures 252 in the corner flexure group 250, the stiffness of the critical flexure 254 is reduced which in turn reduces the magnitude of the stress and internal load in the critical flexure 254. However, in other embodiments, any one more of the other flexures 252 in a corner flexure group 250 may have a smaller flexure thickness 260 than the remaining flexures 252 in the corner flexure group 250. In still further embodiments, each one of the flexures 252 in a corner flexure group 250 may have a flexure thickness 260 that is different than the flexure thickness 260 of the remaining flexures 252 in the corner flexure group 250. However, in some embodiments, all of the flexures 252 in a corner flexure group 250 may have the same flexure thickness 260 and the same taper, which may simplify manufacturing of the balance 200.

Referring to FIGS. 24-25, shown is the presently-disclosed balance 200 illustrating the above-described offset vertical slots 238. Each one of the offset vertical slots 238 is located at a corner flexure group 250. Each offset vertical slot 238 is offset from and is parallel to the balance centerline 204. The offset vertical slot 238 has an inboard slot wall 240 and an outboard slot wall 242. The outboard slot wall 242 defines the laterally inboard side 284 of the flexures 252 in the corner flexure group 250. The inboard slot wall 240 functions as the side wall 286 of the interior portion 232 of the first part 226 or the second part 228. As shown in FIG. 8, the interior portion 232 is located between a pair of corner flexure groups 250 respectively located on opposing lateral sides of the balance centerline 204.

As shown in FIGS. 24-25, the inboard slot wall 240 and the outboard slot wall 242 terminate at a slot base fillet 288. The inboard slot wall 240 transitions into the slot base fillet 288 at a fillet tangent point 290. The fillet tangent point 290 may be described as the boundary between the inboard slot wall 240 and the slot base fillet 288. Each flexure 252 in the corner flexure group 250 each include flexure fillets 266 on each side of the flexure 252 at the intersection 306 of the first flexure root 262 (FIG. 24) with the first part 226 (FIG. 24) of the axial force measurement section 212, and/or at the intersection 306 of the second flexure root 264 with the second part 228 of the axial force measurement section 212.

Figure 27:
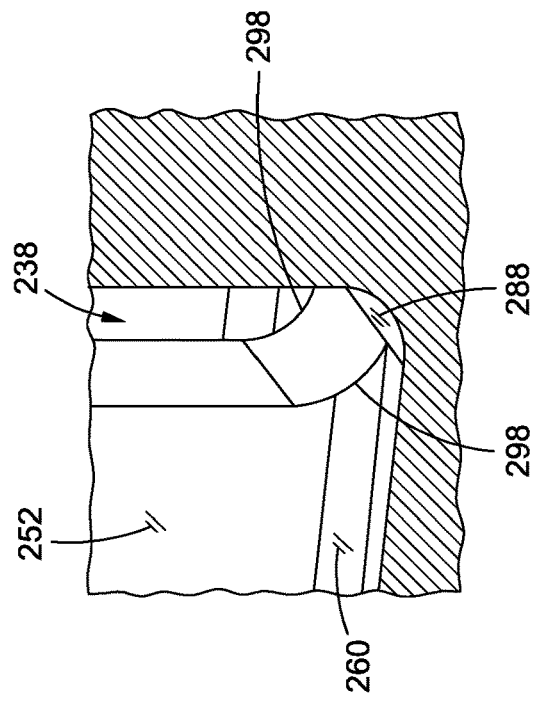
FIG. 27 is a magnified perspective view of the slot base fillet of the prior art balance taken along line 27 of FIG. 26 and illustrating the overlap between the slot base fillet and the flexure fillet.
Figure 26:
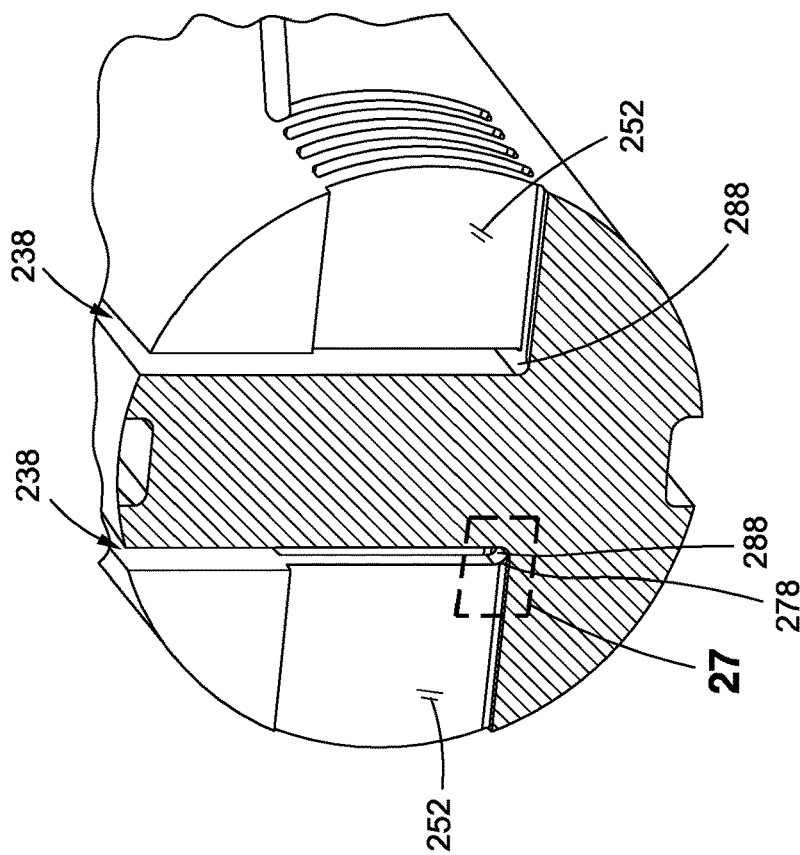
FIG. 26 is a perspective view of a prior art balance sectioned at the same longitudinal location as in FIG. 24 and illustrating the offset vertical slot.

As a means to avoid localized stress concentrations or stress raisers which may reduce fatigue life, the presently-disclosed balance 200 avoids overlapping fillet radii. In this regard, the fillet tangent point 290 is aligned with or is located below the flexure fillet 266. For example, in FIG. 25, the fillet tangent point 290 is flush with the lowermost point of each flexure fillet 266 in the corner flexure group 250. In this manner, each of the flexure fillets 266 in the corner flexure group 250 are non-overlapping with the slot base fillet 288 of the offset vertical slot 238. The non-overlapping arrangement of the slot base fillet 288 with the offset vertical slot 238 in the presently-disclosed balance 200 prevents sharp edges and associated stress concentrations that occur with the overlapping fillet radii 298 of the prior-art balance of FIG. 26-27 wherein the slot base fillet 288 overlaps the offset vertical slot 238.

Referring now to FIGS. 28-35, shown are locations in the presently-disclosed balance 200 incorporating non-constant-radius fillets 302 in cross-sectional transition areas 300 of the balance body 202 as a means to minimize localized stress concentrations and thereby increase the fatigue life of the balance 200. Each cross-sectional transition area 300 may be described as a location of change in the cross-sectional shape or size of the balance body 202. For example, a change in cross-sectional shape may occur at the intersection of two surfaces. In the presently-disclosed balance 200, one or more of the cross-sectional transition areas 300 may include a non-constant-radius fillet 302 in which a profile of the non-constant-radius fillet 302 is a non-radius or is comprised of multiple radii when the non-constant-radius fillet 302 is viewed in transverse cross section. In this regard, a non-constant-radius fillet 302 may be distinguished from a conventional constant radius fillet (i.e., a circular fillet) which has a single radius (e.g., a radius of 0.12 inch, 0.25 inch, etc.) when the fillet is viewed in transverse cross-section. Examples of non-constant-radius fillets 302 incorporated into one or more cross-sectional transition areas 300 of the presently-disclosed balance 200 are compound-radius fillets (e.g., double-radius fillets, triple-radius fillets—not shown), elliptical fillets 304, and streamline fillets (not shown).

A streamline fillet (not shown) has a profile curvature that varies in a manner such that the stress is reduced along the fillet boundary of the intersecting surfaces. However, space limitations may prevent the incorporation of streamline fillets in the presently-disclosed balance 200. An elliptical fillet 304 may be used to effectively mimic the geometry of a streamline fillet. An elliptical fillet 304 has a major axis a representing the longest dimension of a complete ellipse representing the elliptical fillet 304, and a minor axis b representing the shortest dimension of the complete ellipse. In the presently-disclosed balance 200, the major axis a (e.g., the longest dimension) may be oriented generally parallel to the surface which has the highest stress of the intersecting surfaces. In an embodiment, the major axis a of en elliptical fillet 304 may be oriented generally parallel to the balance centerline 204 or generally parallel to the vertical axis 124 (FIG. 4) of the balance 200, and the minor axis b of the ellipse may be oriented generally transverse to the balance centerline 204. The size of the elliptical fillet 304 and the diameter ratio of the length of the major axis a to the length of the minor axis b may be unique to each cross-sectional transition area 300 into which the elliptical fillet 304 is incorporated.

In an embodiment, the shape of the elliptical fillet 304 at each cross-sectional transition area 300 may be obtained by first determining the critical combination of the above-described six components of aerodynamic load (FIG. 4) at the cross-sectional transition area of interest. After determining the critical load combination, an elliptical fillet 304 of the largest size allowed by the geometry and which has a diameter ratio of minor axis b to major axis a of 0.63 may be incorporated into the cross-sectional transition area of interest. The largest size of the elliptical fillet 304 may be the size at which the elliptical fillet 304 is in close proximity to, but does not interfere with the movement of adjacent parts of the balance 200 under any loading conditions. The diameter ratio of minor axis b to major axis a of the elliptical fillet 304 may be varied to find the minima peak stress at the cross-sectional transition area of interest. The minima peak stress may be determined by plotting several points each representing peak stress vs. diameter ratio of minor axis b to major axis a. The plotted points may be fitted to a second order polynomial to find the minima peak stress and corresponding size and diameter ratio of an elliptical fillet 304. The balance 200 may then be analyzed to verify that the previously-determined critical load combination for the cross-sectional transition area of interest with the previous fillet geometry is still the critical load combination using the most-recently-determined elliptical fillet 304 geometry. The process may be repeated in an iterative manner until an optimal elliptical fillet 304 is determined for the cross-sectional transition area of interest.

Figure 30:
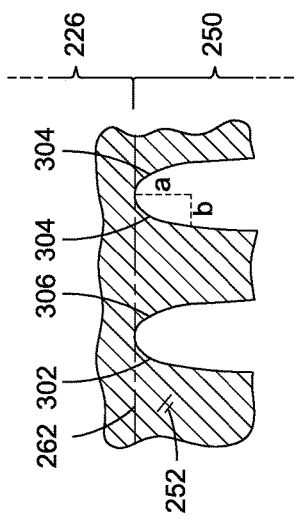
FIG. 30 is a partial sectional view of a portion of the balance taken along line 30 of FIG. 28 and illustrating non-constant-radius fillets at the intersection of the flexure roots with the first part.
Figure 29:
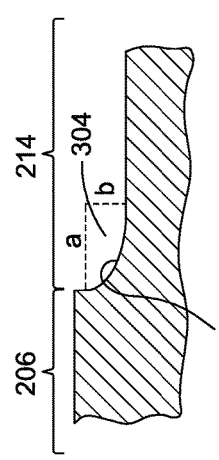
FIG. 29 is a partial sectional view of a portion of the balance taken along line 29-29 of FIG. 28 and illustrating a non-constant-radius fillet at the transition between the model interface portion and the forward moment/force measurement section.
Figure 28:
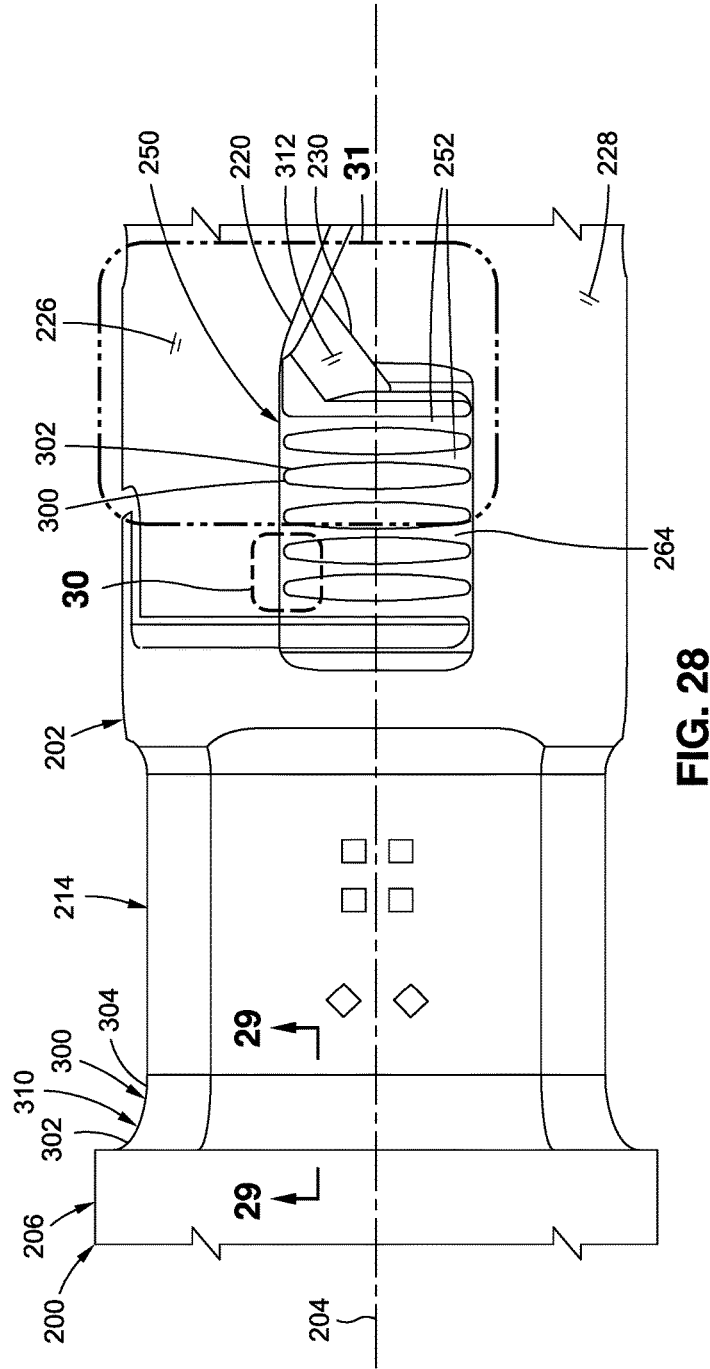
FIG. 28 is a side view of a portion of the balance taken along line 28 of FIG. 5 and illustrating the forward moment/force measurement section and a portion of the axial force measurement section.

FIG. 28 is a side view of a portion of the balance 200 showing a portion of the model interface portion 206 and instrumentation portion 210, and illustrating cross-sectional transition areas 300 that may include non-constant-radius fillets 302. Shown is a transition 310 from the model interface portion 206 and the forward moment/force measurement section 214. FIG. 29 is a partial sectional view of the elliptical fillet 304 at the transition 310 between the model interface portion 206 and the forward moment/force measurement section 214. Although not shown, an elliptical fillet 304 may also be incorporated into the transition between the aft moment/force measurement section 216 (FIG. 2) and the sting interface portion 208 (FIG. 2) of the balance 200. Using the above-described process of determining optimal elliptical fillet 304 size and geometry, the elliptical fillet 304 in FIG. 29 has a ratio of minor axis b to major axis a of approximately 0.45. FIG. 30 is a partial sectional view of non-constant-radius fillets 302 at the intersection 306 of each first flexure root 262 with the first part 226, and/or at the intersection 306 of each second flexure root 264 (FIG. 28) with the second part 228 (FIG. 28). The elliptical fillet 304 on each side of each flexure root may have a ratio of minor axis b to major axis a of approximately 0.67.

Referring to FIGS. 31-33, shown are locations incorporating elliptical fillets 304 where the shovel slot 234 intersects the longitudinal slot 220. Such elliptical fillets 304 reduce peak stresses in the balance body 202. As mentioned above, stresses are magnified at locations of overlapping fillets and at locations where there is an abrupt change in the area moment-of-inertia of the balance body 202. For example, in FIG. 31, stresses are magnified where the relatively large cross-sectional area of the balance 200 represented by the longitudinal slot 220 intersects the relatively small cross-sectional area of the balance 200 represented by the shovel slot 234.

FIG. 31 also illustrates a relief cut 230 incorporated into the location where the longitudinal slot 220 intersects the corner flexure group 250. The relief cut 230 smooths an otherwise abrupt change (e.g., along a direction parallel to the balance centerline 204) in the area moment-of-inertia of the balance 200. The shape of the relief cut 230 is defined by angle θ and distance d. Angle θ is the angle of the relief cut 230 relative to the balance centerline 204 (FIG. 28) when the balance 200 is viewed from the side. Distance d is measured from the upper side of the corner flexure group 250 where the first flexure roots 262 join the first part 226, to a lowermost edge of the relief cut 230. For the area surrounding (e.g., within a 0.5 inch radius) the transition 308 from the longitudinal slot 220 to the shovel slot 234, peak stresses may be identified for a worst-case combination of the six components of aerodynamic load (FIG. 4) that may act on the balance 200. The worst-case combination of loads may be the combination that produces the highest stress in one or more areas surrounding the transition 308. For examples where the peak stresses occur at multiple locations in the area of the transition 308, the angle θ and the distance d may be optimized such that peak stresses at the multiple (e.g., two or more) locations near the transition 308 are minimized and are equal in magnitude.

FIG. 32 is a magnified view of the at the slot forward end 222 showing an elliptical fillet 304 incorporated into the transition 308 from the surfaces of the longitudinal slot 220 (FIG. 31) to the corresponding surfaces of the shovel slot 234 (FIG. 31). Although not shown, an elliptical fillet 304 may also be incorporated into the transition 308 of the longitudinal slot 220 to the shovel slot 234 at the slot aft end 224 (FIG. 5). Using the above-described process of determining the optimal elliptical fillet 304, the elliptical fillet 304 in FIG. 32 has a diameter ratio of minor axis b to major axis a of approximately 0.15. FIG. 33 is a magnified view of an elliptical fillet 304 incorporated into the intersection 312 of the relief cut 230 and the interior portion 232 of the second part 228. At each of the four relief cut 230 locations (e.g., see FIGS. 7-8), the elliptical fillet 304 may be formed at a ratio of minor axis b to major axis a of approximately 0.60.

Figure 35:
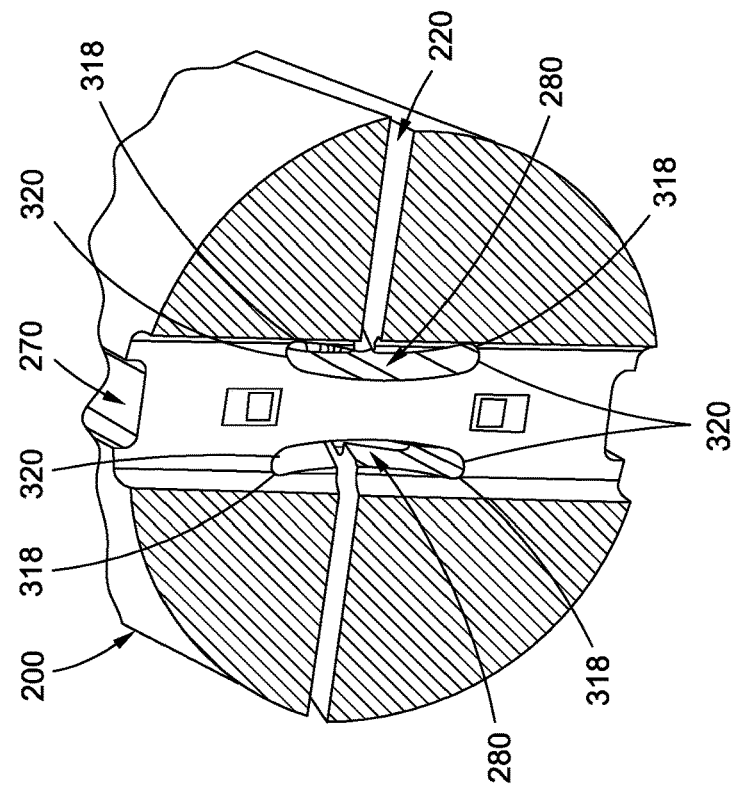
FIG. 35 is a perspective view of the balance sectioned along line 35 of FIG. 5 and illustrating non-constant-radius fillets on the inside corners of a pair of measurement beam vertical slots located on laterally opposite sides of the axial force measurement beam.
Figure 34:
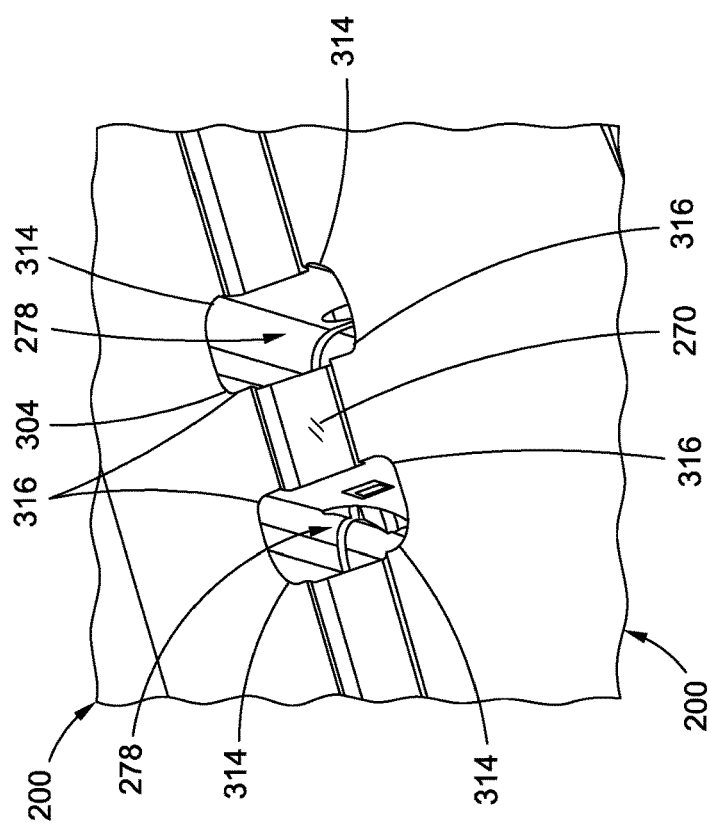
FIG. 34 is a top-down perspective view of a portion of the balance taken along line 34 of FIG. 5 and illustrating non-constant-radius fillets on the inside corners of a pair of measurement beam vertical cutouts located on longitudinally opposite sides of the axial force measurement beam.

FIG. 34 is a perspective view of the balance 200 showing elliptical fillets 304 incorporated into the inside corners 314, 316 of each of the pair of measurement beam vertical cutouts 278 located on each of longitudinally opposite sides of the axial force measurement beam 270. Using the above-described process of determining the optimal elliptical fillet size and geometry, the elliptical fillets 304 in the inside corners 314 located furthest from the axial force measurement beam 270 may have a ratio of minor axis b to major axis a of approximately 0.60. The elliptical fillets 304 in the inside corners 316 located nearest the axial force measurement beam 270 may have a ratio of minor axis b to major axis a of approximately 0.50. FIG. 35 is a perspective view of the balance 200 showing the incorporation of elliptical fillets 304 on the inside corners 318, 320 of a pair of measurement beam vertical slots 280 located on laterally opposite sides of the axial force measurement beam 270. The elliptical fillets 304 in the inside corners 318 located furthest from the axial force measurement beam 270 may have a ratio of minor axis b to major axis a of approximately 0.80. The elliptical fillets 304 in the inside corners 320 located nearest the axial force measurement beam 270 may have a ratio of minor axis b to major axis a of approximately 0.75.

Figure 36:
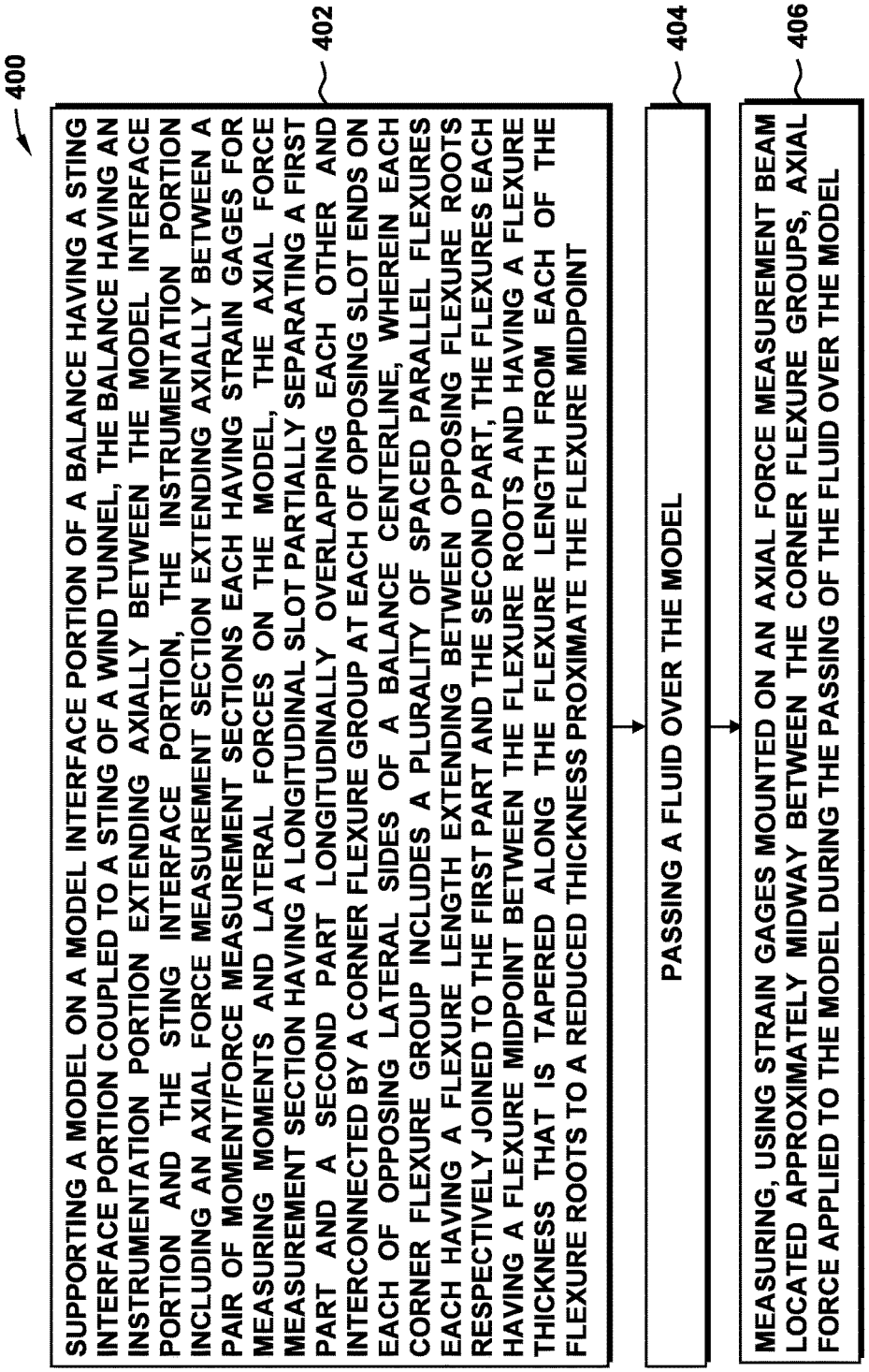
FIG. 36 is a flowchart including one or more operations included in a method of measuring loads on a wind tunnel model.

Referring now to FIG. 36, shown is a flowchart including one or more operations in a method 400 of measuring loads on a model 112 in a wind tunnel 100. Step 402 of the method 400 includes supporting the model 112 on the model interface portion 206 of the balance 200 having a sting interface portion 208 coupled to the sting 102 of the wind tunnel 100 as shown in FIG. 1. As described above, the balance 200 has an instrumentation portion 210 (FIG. 5) extending axially between the model interface portion 206 and the sting interface portion 208. The instrumentation portion 210 includes the axial force measurement section 212 (FIG. 13) extending axially between a pair of moment/force measurement sections 214, 216 which have strain gages 218 for determining moments and/or lateral forces on the model 112. As shown in FIGS. 4-8, the axial force measurement section 212 has a longitudinal slot 220 partially separating the first part 226 from the second part 228 which longitudinally overlap each other and which are interconnected by the corner flexure groups 250 located at each of the opposing slot ends 222, 224 and on each of opposing lateral sides of the balance centerline 204.

Step 404 of the method 400 includes passing a fluid 110 such as air over the model 112 as shown in FIG. 1. As mentioned above, air flows over the model 112 at controlled speeds in order to evaluate the aerodynamic response of the model 112 aircraft 114. Using the sting 102 (FIG. 1), the model 112 may be statically positioned and/or dynamically moved as air flows over the aircraft 114 during testing. For example, the sting 102 may rotate the aircraft 114 about the longitudinal axis 120 to change the roll attitude, rotate the aircraft 114 about the lateral axis 122 to change the pitch attitude, and/or rotate the aircraft 114 about the vertical axis 124 to change the yaw attitude of the aircraft 114 while the balance 200 measures aerodynamic loads on the model 112 aircraft 114.

Step 406 of the method 400 includes determining, using strain gages 243, 244, 245, 246 (FIG. 15) mounted on the axial force measurement beam 270 (FIGS. 6 and 15) located approximately midway between the corner flexure groups 250, axial force AF applied to the model 112 during the passing of the fluid 110 over the model 112. As described above, each corner flexure group 250 includes one or more flexures 252. For example, each corner flexure group 250 may include a plurality of spaced parallel flexures 252 each having a flexure length 256 extending between the first flexure root 262 and the second flexure root 264 which are respectively joined to the first part 226 and the second part 228. As mentioned above, the flexures 252 each have a flexure midpoint 268 located midway between the first flexure root 262 and the second flexure root 264. In addition, as shown in FIGS. 17-19, each flexure 252 has a flexure thickness 260 that is tapered along the flexure length 256 the first flexure root 262 and the second flexure root 264 to a reduced thickness proximate the flexure midpoint 268. As described above, the flexure thickness 260 of each flexure 252 in a corner flexure group 250 may be tapered in a manner such that stress (e.g., tensile stress and bending stresses) in the flexure 252 is approximately constant along the flexure length 256. In some embodiments, the flexure thickness 260 of each flexure 252 in a corner flexure group 250 may be uniquely tapered according to an anticipated load to be borne by the flexure 252 during wind tunnel testing.

The method 400 may further include orienting the wind tunnel model 112 in a manner causing a normal force NF (FIG. 4) to be applied to the balance 200. As indicated above, normal force NF on the model 112 may be described as lift force which generally acts perpendicularly relative to the flow direction. If the fluid 110 flow is horizontal through the wind tunnel 100 of FIG. 1, the normal force NF may be described as vertically upward along the vertical axis 124. The method may include measuring the normal force NF using strain gages 218 mounted on the pair of moment/force measurement sections 214, 216 (FIGS. 2-4) while measuring axial force AF using strain gages 243, 244, 245, 246 mounted on the axial force measurement beam 270 (FIGS. 6 and 15). As a result of the flexure thickness 260 being tapered, the flexures 252 may flex along a direction parallel to the balance centerline 204 (FIGS. 13, 16, and 17) in a manner reducing a magnitude of the normal force interaction on the axial force measurement of the balance 200 relative to the magnitude of normal force interaction on axial force measurement of an equivalent balance (not shown) having non-tapered flexures.

During wind testing, the method 400 may additionally include adjusting the fluid flow (e.g., air velocity) and/or the orientation of the model 112 in a manner causing the simultaneous application of the six components of aerodynamic load (FIG. 4) to the model 112. As mentioned above, the six components include the normal force NF, the side force SF, the pitching moment PM, the rolling moment RM, the yawing moment YM, and the axial force AF. The method may include measuring, using the strain gages 218 mounted on the pair of moment/force measurement sections 214, 216, the normal force NF, the side force SF, the pitching moment PM, the rolling moment RM, and the yawing moment YM while measuring the axial force AF using strain gages 243, 244, 245, 246 mounted on the axial force measurement beam 270. Advantageously, the flexure thickness 260 of each of the flexures 252 in the four (4) corner flexure groups 250 may be tapered in a manner such that stress in the flexures 252 is constant along the flexure length 256 when the six components of aerodynamic load are simultaneously applied to the model 112.

As indicated above and illustrated in FIG. 18, the flexures 252 in each corner flexure group 250 may have the same flexure thickness 260 and the same taper to simplify manufacturing. However, the balance 200 may be provided in an embodiment in which the flexure 252 (i.e., the critical flexure 254) located nearest the balance longitudinal center 276 (FIG. 5) may have a flexure thickness 260 that is less than (e.g., by 10-50%) the corresponding flexure thickness 260 at the same flexure lengthwise location in each of the remaining flexures 252 in the corner flexure group 250. As mentioned above, such an arrangement may reduce the stiffness of the critical flexure 254 which may reduce the magnitude of the stress in the critical flexure 254 such as to a level below the allowable stress of the balance material. Once the flexure thickness 260 of the flexure 252 nearest the balance longitudinal center 276 is reduced, such flexure 252 may no longer be the critical flexure 254 in the corner flexure group 250. As mentioned above, in other embodiments, any one or more of the other flexures 252 in a corner flexure group 250 may have a flexure thickness 260 that is less than the flexure thickness 260 of the remaining flexures 252 in the corner flexure group 250.

As illustrated in FIGS. 24-25, the balance body 202 at each corner flexure group 250 includes an offset vertical slot 238 which is offset from and is parallel to the balance centerline 204. The offset vertical slot 238 has opposing slot walls including an inboard slot wall 240 and an outboard slot wall 242 which respectively correspond to the laterally inboard side 284 of the flexures 252 and the side wall 286 of the interior portion 232 of the first part 226 or the second part 228. As described above and illustrated in FIGS. 8, 11, and 24, each interior portion 232 is located between a pair of the corner flexure groups 250 respectively located on opposing lateral sides of the balance centerline 204. As shown in FIGS. 24-25, the inboard slot wall 240 transitions to the slot base fillet 288 at the fillet tangent point 290. In order to avoid overlapping fillet radii, the fillet tangent point 290 is aligned with (e.g., is flush with or is located below) the lowermost portion of each flexure 252 fillet formed at the intersection 306 of each flexure root 262, 264 respectively with the first part 226 and the second part 228.

As described above and illustrated in FIGS. 28-35, the balance 200 includes a plurality of cross-sectional transition areas 300 which are described as locations where the cross-sectional shape or size of the balance 200 changes. Advantageously, in the presently-disclosed balance 200, the cross-sectional transition areas 300 that are subjected to relatively high stress are formed as non-constant-radius fillet 302. For example, as discussed above, the non-constant-radius fillets 302 may be formed as elliptical fillets 304 (FIGS. 28-35) as a means to minimize stress concentrations and thereby improve the fatigue life of the balance 200.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. An internal balance for a wind tunnel model, comprising:
   a balance body having a balance centerline and including an instrumentation portion extending axially between a model interface portion for supporting a wind tunnel model, and a sting interface portion for coupling to a sting of a wind tunnel;
   the instrumentation portion including an axial force measurement section and at least one moment/force measurement section having strain gages for determining at least one of moments and lateral forces on the model;
   the axial force measurement section including a longitudinal slot having opposing slot ends and partially dividing the axial force measurement section into a first part and a second part longitudinally overlapping each other and interconnected by a corner flexure group at each of the slot ends on each of opposing lateral sides of the balance centerline;
   the axial force measurement section having an axial force measurement beam located at a balance longitudinal center approximately midway between the corner flexure groups, the axial force measurement beam having a measurement beam first end and a measurement beam second end respectively coupled to the first part and the second part and having strain gages for determining axial force on the model; and
   each corner flexure group including a plurality of spaced parallel flexures each having a flexure length extending between a first flexure root and a second flexure root respectively joined to the first part and the second part, the flexures each having a flexure midpoint between the first and second flexure roots and having a flexure thickness that is tapered along the flexure length from each of the first and second flexure roots to a reduced thickness proximate the flexure midpoint.

2. The balance of claim 1, wherein:
the flexure thickness is tapered in a manner such that stress in the flexure is approximately constant along the flexure length.

3. The balance of claim 1, wherein:
the flexure thickness of each flexure in a corner flexure group is uniquely tapered according to an anticipated load to be borne by the flexure.

4. The balance of claim 1, wherein:
the flexures in each corner flexure group have the same flexure thickness and the same taper.

5. The balance of claim 1, wherein:
in each corner flexure group, the flexure nearest the balance longitudinal center has a flexure thickness that is less than the corresponding flexure thickness at the same flexure lengthwise location in each of the remaining flexures in the corner flexure group.

6. The balance of claim 1, wherein:
the strain gages of the at least one moment/force measurement section is configured to determine lateral forces and moments on the model including a normal force, a side force, a pitching moment, a rolling moment, and a yawing moment; and
the flexure thickness is tapered in a manner such that stress in the flexure is approximately constant along the flexure length when the normal force, the side force, the pitching moment, the rolling moment, the yawing moment, and the axial force are simultaneously applied to the balance.

7. The balance of claim 1, wherein:
the balance body includes a vertical slot at each corner flexure group, the vertical slot having an inboard slot wall and an outboard slot wall respectively defining a laterally inboard side of the flexures in the corner flexure group and a side wall of an interior portion of the first part or the second part, the interior portion located between a pair of the corner flexure groups respectively on opposing lateral sides of the balance centerline;
the inboard slot wall and the outboard slot wall at each corner flexure group terminating at a slot base fillet, the inboard slot wall transitioning to the slot base fillet at a fillet tangent point; and
at least one flexure in at least one corner flexure group includes a flexure fillet at an intersection of the first flexure root or the second flexure root respectively with the first part or the second part, the fillet tangent point being aligned with a lowermost portion of the flexure fillet.

8. The balance of claim 1, wherein:
the balance body includes a plurality of cross-sectional transition areas, each cross-sectional transition area being a location of a change in a cross-sectional shape or size of the balance body; and
at least one of the cross-sectional transition areas has a non-constant-radius fillet in which a profile of the non-constant-radius fillet when viewed in transverse cross section is a non-radius or is comprised of multiple radii.

9. The balance of claim 8, wherein:
the non-constant-radius fillet in at least one of the cross-sectional transition areas is one of an elliptical fillet and a streamline fillet.

10. The balance of claim 8, wherein at least one of the following cross-sectional transition areas has a non-constant-radius fillet:
an intersection of at least one of the first flexure root and the second flexure root respectively with the first part or the second part;
a transition from the longitudinal slot to a shovel slot separating the first part from the second part;
a transition from the instrumentation portion to at least one of the model interface portion and the sting interface portion;
an intersection of a relief cut with a wall of an interior portion of the first part or the second part;
an inside corner of a measurement beam vertical cutout defining the axial force measurement beam; and
an inside corner of a measurement beam vertical slot defining the axial force measurement beam.

11. An internal balance for a wind tunnel model, comprising:
a balance body having a balance centerline and an instrumentation portion having an axial force measurement section and at least one moment/force measurement section, the axial force measurement section including a longitudinal slot having opposing slot ends and partially dividing the axial force measurement section into a first part and a second part longitudinally overlapping each other and interconnected by a corner flexure group at each of the slot ends on each of opposing lateral sides of the balance centerline, each corner flexure group including a plurality of spaced parallel flexures each having a flexure length extending between a first flexure root and a second flexure root respectively joined to the first part and the second part;
the axial force measurement section having an axial force measurement beam located approximately midway between the corner flexure groups and having a measurement beam first end and a measurement beam second end respectively coupled to the first part and the second part;
the balance body including a vertical slot at each corner flexure group, the vertical slot having an inboard slot wall and an outboard slot wall respectively defining a laterally inboard side of the flexures in the corner flexure group and a side wall of an interior portion of the first part or the second part, the interior portion located between a pair of the corner flexure groups respectively on opposing lateral sides of the balance centerline;
the inboard slot wall and the outboard slot wall at each corner flexure group terminating at a slot base fillet, the inboard slot wall transitioning to the slot base fillet at a fillet tangent point; and
at least one flexure in at least one corner flexure group includes a flexure fillet at an intersection of the first flexure root or the second flexure root respectively with the first part or the second part, the fillet tangent point being aligned with a lowermost portion of the flexure fillet.

12. A method of measuring loads on a model in a wind tunnel, comprising:
supporting a model on a model interface portion of a balance having a sting interface portion coupled to a sting of a wind tunnel, the balance having an instrumentation portion extending axially between the model interface portion and the sting interface portion, the instrumentation portion including an axial force measurement section and at least one moment/force measurement section having strain gages for determining at least one of moment and lateral force on the model, the axial force measurement section having a longitudinal slot partially separating a first part and a second part longitudinally overlapping each other and interconnected by a corner flexure group at each of opposing slot ends on each of opposing lateral sides of a balance centerline;
passing a fluid over the model;
determining, using strain gages mounted on an axial force measurement beam located approximately midway between the corner flexure groups, axial force applied to the model during the passing of the fluid over the model; and
wherein each corner flexure group includes a plurality of spaced parallel flexures each having a flexure length extending between a first flexure root and a second flexure root respectively joined to the first part and the second part, the flexures each having a flexure midpoint between the first flexure root and second flexure root and having a flexure thickness that is tapered along the flexure length from each of the first flexure root and second flexure root to a reduced thickness proximate the flexure midpoint.

13. The method of claim 12, wherein:
the flexure thickness is tapered in a manner such that stress in the flexure is approximately constant along the flexure length.

14. The method of claim 12, wherein:
the flexure thickness of each flexure in a corner flexure group is uniquely tapered according to an anticipated load to be borne by the flexure.

15. The method of claim 12, further including:
adjusting an orientation of the model in a manner causing a normal force to be applied to the balance;
measuring the normal force using strain gages mounted on the moment/force measurement section while measuring the axial force using strain gages mounted on the axial force measurement beam; and
flexing the flexures along a direction parallel to the balance centerline in a manner reducing a magnitude of normal force interaction on axial force measurement of the balance relative to the magnitude of normal force interaction on axial force measurement of an equivalent balance having non-tapered flexures.

16. The method of claim 12, further including:
adjusting fluid flow and model orientation in a manner causing simultaneous application of six load components to the model including a normal force, a side force, a pitching moment, a rolling moment, a yawing moment, and the axial force;
measuring, using the strain gages mounted on the moment/force measurement section, the normal force, the side force, the pitching moment, the rolling moment, and the yawing moment while measuring axial force using strain gages mounted on the axial force measurement beam; and
wherein the flexure thickness is tapered in a manner such that stress in the flexure is constant along the flexure length when the six load components are simultaneously applied to the model.

17. The method of claim 12, wherein:
the flexures in each corner flexure group have the same flexure thickness and the same taper.

18. The method of claim 12, wherein:
the axial force measurement beam is located at a balance longitudinal center approximately midway between the corner flexure groups; and
in each corner flexure group, the flexure nearest the balance longitudinal center has a flexure thickness that is less than the corresponding flexure thickness at the same flexure lengthwise location in each of the remaining flexures in the corner flexure group.

19. The method of claim 12, wherein:
the balance includes a vertical slot at each corner flexure group, the vertical slot having an inboard slot wall and an outboard slot wall respectively defining a laterally inboard side of the flexures in the corner flexure group and a side wall of an interior portion of the first part or the second part, the interior portion located between a pair of the corner flexure groups respectively on opposing lateral sides of the balance centerline;
the inboard slot wall and the outboard slot wall at each corner flexure group terminating at a slot base fillet, the inboard slot wall transitioning to the slot base fillet at a fillet tangent point; and
at least one flexure in at least one corner flexure group includes a flexure fillet at an intersection of the first flexure root or the second flexure root respectively with the first part or the second part, the fillet tangent point being aligned with a lowermost portion of the flexure fillet.

20. The method of claim 12, wherein:
the balance includes a plurality of cross-sectional transition areas, each cross-sectional transition area being a location of a change in a cross-sectional shape or size of the balance; and
at least one of the cross-sectional transition areas has a non-constant-radius fillet in which a profile of the non-constant-radius fillet when viewed in transverse cross section is a non-radius or is comprised of multiple radii.

* * * * *